(12) United States Patent
Saito

(10) Patent No.: US 11,031,006 B2
(45) Date of Patent: Jun. 8, 2021

(54) INFORMATION PROCESSING APPARATUS, INFORMATION PROCESSING METHOD, AND PROGRAM

(71) Applicant: SONY CORPORATION, Tokyo (JP)

(72) Inventor: Mari Saito, Kanagawa (JP)

(73) Assignee: SONY CORPORATION, Tokyo (JP)

(\*) Notice: Subject to any disclaimer, the term of this patent is extended or adjusted under 35 U.S.C. 154(b) by 219 days.

(21) Appl. No.: 16/304,911

(22) PCT Filed: Aug. 15, 2017

(86) PCT No.: PCT/JP2017/029342
§ 371 (c)(1),
(2) Date: Nov. 27, 2018

(87) PCT Pub. No.: WO2018/043113
PCT Pub. Date: Mar. 8, 2018

(65) Prior Publication Data
US 2020/0335098 A1    Oct. 22, 2020

(30) Foreign Application Priority Data

Aug. 29, 2016 (JP) .............................. JP2016-167012

(51) Int. Cl.
*G10L 15/00* (2013.01)
*G10L 15/04* (2013.01)
(Continued)

(52) U.S. Cl.
CPC ............. *G10L 15/22* (2013.01); *G06F 3/167* (2013.01); *G06F 16/2379* (2019.01); *G06F 21/62* (2013.01); *G06Q 50/265* (2013.01)

(58) Field of Classification Search
None
See application file for complete search history.

(56) References Cited

U.S. PATENT DOCUMENTS 8,117,178 B2 \* 2/2012 Qi ........................ G06F 16/3344
707/706
8,224,839 B2 \* 7/2012 Krupka ................... G06F 3/167
707/765

(Continued)

*Primary Examiner* — Satwant K Singh
(74) *Attorney, Agent, or Firm* — Paratus Law Group, PLLC

(57) ABSTRACT

The present technology relates to an information processing apparatus, an information processing method, and a program that enable provision of information to a user while protecting privacy. An extraction unit that extracts information from an utterance of a user, an inquiry unit that makes an inquiry to another apparatus when a request from the user is given, and a supplementation unit that supplements the information extracted by the extraction unit to inquiry content when the inquiry unit makes an inquiry are provided. A determination unit that determines whether or not the information supplemented by the supplementation unit is information regarding privacy is further provided. The information extracted by the extraction unit is registered to a database in association with a flag indicating whether or not the information is the information regarding privacy. The present technology can be applied to an information processing apparatus that presents information to a user.

18 Claims, 22 Drawing Sheets

(51) Int. Cl.
*G10L 15/22* (2006.01)
*G06F 16/23* (2019.01)
*G06F 3/16* (2006.01)
*G06F 21/62* (2013.01)
*G06Q 50/26* (2012.01)

(56) References Cited

U.S. PATENT DOCUMENTS

| | | | |
|---|---|---|---|
| 9,380,330 B2 * | 6/2016 | Shin | H04N 21/278 |
| 2014/0258272 A1 * | 9/2014 | Ai | G06F 16/9535 |
| | | | 707/722 |

* cited by examiner

| USER | TOPIC | KEYWORD | SECRET FLAG | UPDATE DATE AND TIME |
|---|---|---|---|---|
| USER A | HEALTH | URIC ACID LEVEL | 1 | 20160404 19:35 |
| USER A | HEALTH | BLOOD PRESSURE | 1 | 20140402 21:47 |
| USER A | ASSETS | BANK OF ACCOUNT | 1 | 20151210 09:05 |
| USER A | TRAVEL | RYOKAN | 0 | 20160611 10:32 |
| USER B | TRAVEL | CAMP | 1 | 20110811 17:45 |
| USER B | FANCYWORK | KNITTING | 0 | 20160707 10:28 |
| ... | ... | ... | ... | ... |

FIG. 10

| USER | TOPIC | KEYWORD | SECRET FLAG | UPDATE DATE AND TIME |
|---|---|---|---|---|
| USER A | HEALTH | URIC ACID LEVEL | 0 | 20160725 20:24 |
| USER A | HEALTH | BLOOD PRESSURE | 1 | 20140402 21:47 |
| USER A | ASSETS | BANK OF ACCOUNT | 1 | 20151210 09:05 |
| USER A | TRAVEL | RYOKAN | 0 | 20160611 10:32 |
| USER B | TRAVEL | CAMP | 1 | 20110811 17:45 |
| USER B | FANCYWORK | KNITTING | 0 | 20160707 10:28 |
| ... | ... | ... | ... | ... |

| USER | TOPIC | KEYWORD | SECRET FLAG | UPDATE DATE AND TIME |
|---|---|---|---|---|
| USER A | RENOVATION | RENOVATION | 1 | 20160405 19:35 |
| USER B | SAFETY | SECURITY | 1 | 20140405 19:35 |
| ... | ... | ... | ... | ... |

FIG. 20

| USER | TOPIC | KEYWORD | SECRET FLAG | UPDATE DATE AND TIME |
|---|---|---|---|---|
| USER A | RENOVATION | RENOVATION | 0 | 20160407 19:30 |
| USER B | SAFETY | SECURITY | 1 | 20140405 19:35 |
| USER A | RENOVATION | BATH | 0 | 20160407 19:30 |
| ... | ... | ... | ... | ... |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/029342 (filed on Aug. 15, 2017) under 35 U.S.C. § 371, which claims priority to Japanese Patent Application No. 2016-167012 (filed on Aug. 29, 2016), which are all hereby incorporated by reference in their entirety.

TECHNICAL FIELD

The present technology relates to an information processing apparatus, an information processing method, and a program, and relates to, for example, an information processing apparatus, an information processing method, and a program for providing information to a user in a state in which privacy of the user is protected.

BACKGROUND ART

Patent Document 1 proposes a system that records a conversation between users on a steady basis and can confirm the conversation at a point of time after the recording.

Patent Document 2 proposes monitoring a conversation between users, recording a specific keyword, and notifying another user of the keyword, thereby maintaining a favorable state of community.

CITATION LIST

Patent Document

Patent Document 1: Japanese Patent Application Laid-Open No. 2005-237017
Patent Document 2: Japanese Patent Application Laid-Open No. 2014-81782

SUMMARY OF THE INVENTION

Problems to be Solved by the Invention

Patent Documents 1 and 2 propose recording of a conversation between users. However, if all of conversations are recorded, the privacy of the users may not be protected.

The present technology has been made in view of the foregoing situation, and enables provision of information to a user while protecting privacy.

Solutions to Problems

An information processing apparatus according to one aspect of the present technology includes an extraction unit configured to extract information from an utterance of a user, an inquiry unit configured to make an inquiry to another apparatus when a request from the user is given, and a supplementation unit configured to supplement the information extracted by the extraction unit to inquiry content when the inquiry unit makes an inquiry.

An information processing method according to one aspect of the present technology includes the steps of extracting information from an utterance of a user, making an inquiry to another apparatus when a request from the user is given, and supplementing the extracted information to inquiry content when making the inquiry.

A program according to one aspect of the present technology causes a computer to execute processing including the steps of extracting information from an utterance of a user, making an inquiry to another apparatus when a request from the user is given, and supplementing the extracted information to inquiry content when making the inquiry.

In the information processing apparatus, the information processing method, and the program according to the aspects of the present technology, the information is extracted from the utterance of the user, and the inquiry is made to the another apparatus when the request from the user is given, and the extracted information is supplemented to the inquiry content when the inquiry is made.

Note that the information processing apparatus may be an independent apparatus or may be internal blocks configuring one apparatus.

Furthermore, the program can be provided by being transmitted via a transmission medium or by being recorded on a recording medium.

Effects of the Invention

According to one aspect of the present technology, information can be provided to a user while protecting privacy.

Note that the effects described here are not necessarily limited, and any of effects described in the present disclosure may be exhibited.

BRIEF DESCRIPTION OF DRAWINGS

FIG. 8 is a diagram for describing a secret database.
FIG. 10 is a diagram for describing the secret database.
FIG. 18 is a diagram for describing the secret database.

FIG. 20 is a diagram for describing the secret database.

MODE FOR CARRYING OUT THE INVENTION

Hereinafter, modes for implementing the present technology (hereinafter referred to as embodiments) will be described.

<Configuration Example of System>

Figure 1:
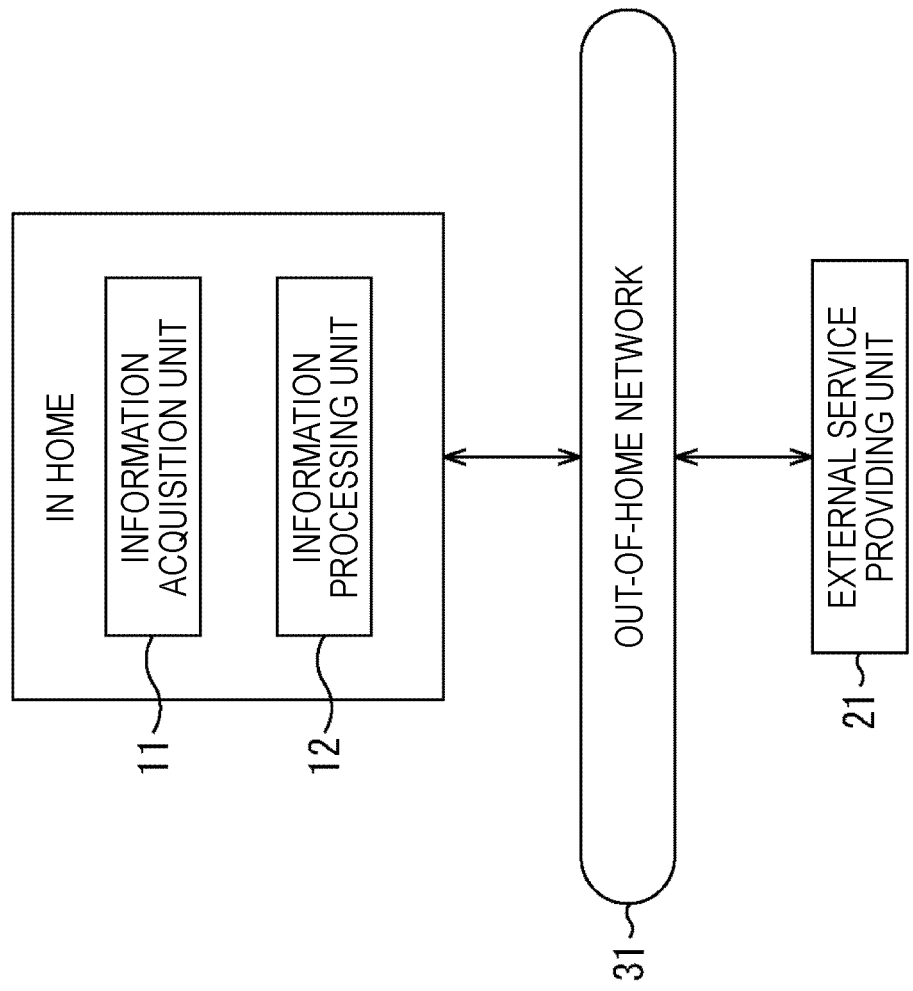
FIG. 1 is a diagram illustrating a configuration of an embodiment of an information processing system to which the present technology is applied.

FIG. 1 is a diagram illustrating a configuration of an embodiment of an information processing system to which the present technology is applied. In the information processing system, an information acquisition unit 11, an information processing unit 12, and an external service providing unit 21 are connected via an out-of-home network 31.

In the information processing system illustrated in FIG. 1, the information acquisition unit 11 and the information processing unit 12 are illustrated as devices installed in home. However, as in the information processing system illustrated in FIG. 2, the information processing unit 12 may be installed outside the home and configured to give and receive data to and from the information acquisition unit 11 via the out-of-home network 31.

In the information processing system illustrated in FIG. 1, the information acquisition unit 11 and the information processing unit 12 are installed in home and connected via a network constructed in home, for example, a local area network (LAN) configured in a wireless or wired manner, and are configured to give and receive data to and from each other via the network.

Further, the information processing unit 12 is connected to the external service providing unit 21 via the out-of-home network 31, and is configured to give and receive data to and from the external service providing unit 21.

In the information processing system illustrated in FIG. 1 or 2 (hereinafter, description continues taking the information processing system illustrated in FIG. 1 as an example), information is acquired by the information acquisition unit 11. The acquired information is, for example, an utterance of a user, a conversation between users, information for identifying a user, or the like.

The information acquired by the information acquisition unit 11 is supplied to and processed by the information processing unit 12. For example, the information processing unit 12 records a conversation of users, extracts a keyword, identifies a user who is talking, and identifies in which room in home the user is talking. Furthermore, the information processing unit 12 makes an inquiry about predetermined information to the external service providing unit 21, and provides an inquiry result to the user.

When an inquiry is made to the external service providing unit 21, various conditions are taken into consideration, and processing of not leaking privacy of the user to the outside (for example, outside the home) is performed, as described below. Therefore, information to be provided to the user can be acquired and presented in a state where the privacy of the user is protected.

The external service providing unit 21 may be a server so-called search server, or a server that manages a shopping site that offers shopping and the like.

<Processing Example in System>

Processing in the information processing system illustrated in FIG. 1 will be described with reference to FIGS. 3 and 4. In the information processing system, information required by a user can be provided in the state where the privacy of the user is protected.

Processing by the information processing system in a case where information of the user is not kept secret (protection of the privacy is not necessary) will be described with reference to FIG. 3.

At a time t1, a user A utters "Tell me the weather in Okutama weekend" to the information processing system. Such an utterance is acquired by the information acquisition unit 11 and is supplied to the information processing unit 12. The information processing unit 12 determines whether or not uttered content includes information regarding privacy of the user. The "weekend", "Okutama", "weather", and the like are determined not to be the information regarding privacy of the user.

In a case where the information processing unit 12 determines that there is no information regarding privacy, the information processing unit 12 makes an inquiry to the external service providing unit 21. In this case, the information processing unit 12 makes an inquiry about "the weather in Okutama weekend" to the external service providing unit 21 that provides information regarding the "weather".

As a result, at a time t2, the information processing system (information processing unit 12) acquires information regarding "the weather in Okutama weekend" and provides the acquired information to the user A. For example, as illustrated in FIG. 3, information such as "The weather in Okutama will be sunny next week and the rain probability is 10%" is provided.

In a case where there is no information regarding privacy of the user, such processing is performed. On the other hand, a case where there is information regarding privacy of the user will be described with reference to FIG. 4.

At the time t1, the user A utters "Tell the prognosis of the stage 3 of the cancer" to the information processing system. Keywords such as the "cancer", the "stage 3", and the "prognosis" are considered to have a high possibility of being related to the privacy of the user, such as the user A having had the cancer, or having had the cancer of the stage 3.

In a case where such keywords are detected, the information processing unit 12 determines that the uttered content is the information regarding privacy (information to be kept secret). Such determination is made by reference to a database (hereinafter described as a secret database) that accumulates information for determining whether or not the uttered content is the information (keywords) to be kept secret, as described below.

In the secret database, flags are set for the keywords to be kept secret, and in this case, the flags are set for the keywords such as the "cancer" and the "stage 3". The information processing unit 12 refers to such a secret database, determines whether or not the request from the user such as "Tell the prognosis of the stage 3 of the cancer" includes the keywords for which the flags are set, and as a result, concludes that the request includes the keywords. Note that, in selecting words to be flagged, a group of words that are generally kept secret for privacy may be discriminated by mechanical learning or the like, or categories or the like are presented to users and the individual users may specify the words.

In a case where such information required to be kept secret is included, notification of the possibility that the inquiry includes the information regarding privacy is provided to the user and confirmation as to whether or not such information may be output to the outside are performed to the user before starting the inquiry to the external service providing unit 21 (before outputting the private information to the outside). In other words, in the example illustrated in FIG. 4, at the time t2, the information processing unit 12 asks the user A about a question "This is a search for disease. Do you want to search for the prognosis of the stage 3 of the cancer?".

In this case, the search is for the "search for disease", and the information processing unit 12 notifies the user A of a possibility that the search is associated with the privacy of the user A, and confirms whether or not the user A really desires the search, with the message "Do you want to search for the prognosis of the stage 3 of the cancer".

In a case where the user A, who has listened to such a message, says "Do search under anonymity" at a time t3, the information processing system sends a reply "I'm doing search without a user ID" at a time t4. That is, in this case, the user A gives a desire that he/she wants to do search under anonymity, and the information processing system sends the reply of doing search without a user ID. Thereafter, the information processing system makes an inquiry to the external service providing unit 21 without outputting information that identifies the user, acquires information, and provides the information to the user A.

Alternatively, in a case where the user A gives an instruction on cancellation of the inquiry to the external service providing unit 21, such as "Cancel the search", the inquiry to the external service providing unit 21 is canceled. Alternatively, in such a case, an inquiry excluding the information regarding privacy (keywords) may be executed.

As described above, in a case where there is a possibility of providing the information regarding privacy of the user to the external service providing unit 21, notification of the possibility of outputting the information regarding privacy to the outside is provided to the user, and whether or not the information may be output to the outside is asked to the user. By such processing, the information regarding privacy of the user can be prevented from being output to the outside without an intention of the user, and the search and provision of information can be performed in the state where the privacy of the user is protected.

<Configuration of Information Acquisition Unit>

Figure 5:
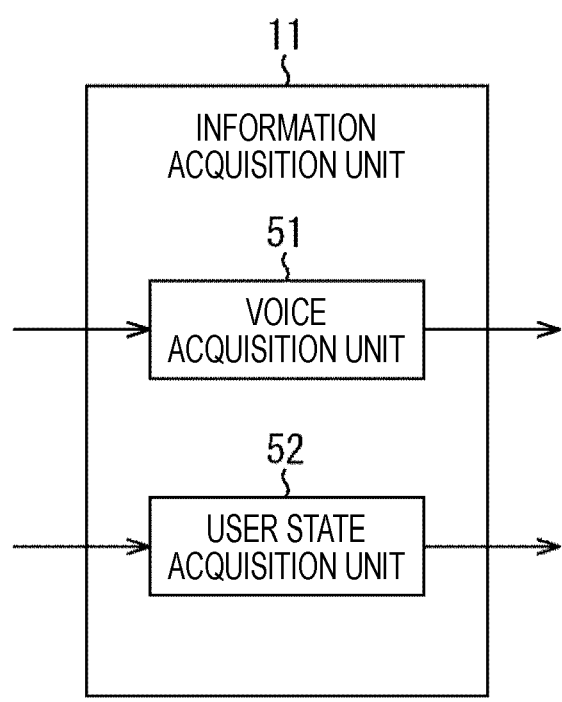
FIG. 5 is a diagram for describing a configuration of an information acquisition unit.

Configurations of the information acquisition unit 11 and the information processing unit 12 that perform the above-described processing will be described. First, the configuration of the information acquisition unit 11 will be described with reference to FIG. 5.

The information acquisition unit 11 includes a voice acquisition unit 51 and a user state acquisition unit 52. The voice acquisition unit 51 includes, for example, a microphone, and a plurality of the voice acquisition units is installed in home. For example, there are rooms in home, such as a living room, a dining room, a kitchen, a bedroom, a children's room, and an entrance. The microphones are installed in these rooms, collect a conversation of the user, and record the conversation as necessary.

The user state acquisition unit 52 acquires, for example, information for specifying the user who is talking, information such as a direction the user faces. The user state acquisition unit 52 includes, for example, an imaging unit and various sensors, and a plurality of the user state acquisition units 52 is installed in home. The user state acquisition unit 52 is installed in each room such as a living room, a dining room, a kitchen, a bedroom, a children's room, or an entrance, like the voice acquisition unit 51, and collects information for specifying the user in the room, and information such as a gaze direction of the user in the room.

<Configuration of Information Processing Unit>

The information acquired by the information acquisition unit 11 is supplied to and processed by the information processing unit 12. The configuration of the information processing unit 12 will be described with reference to FIG. 6.

The information processing unit 12 includes a user state analysis unit 71, a user database 72, a user recognition unit 73, a voice processing unit 74, a secret database creation unit 75, a secret database 76, a secret information determination unit 77, and an inquiry generation unit 78.

Figure 2:
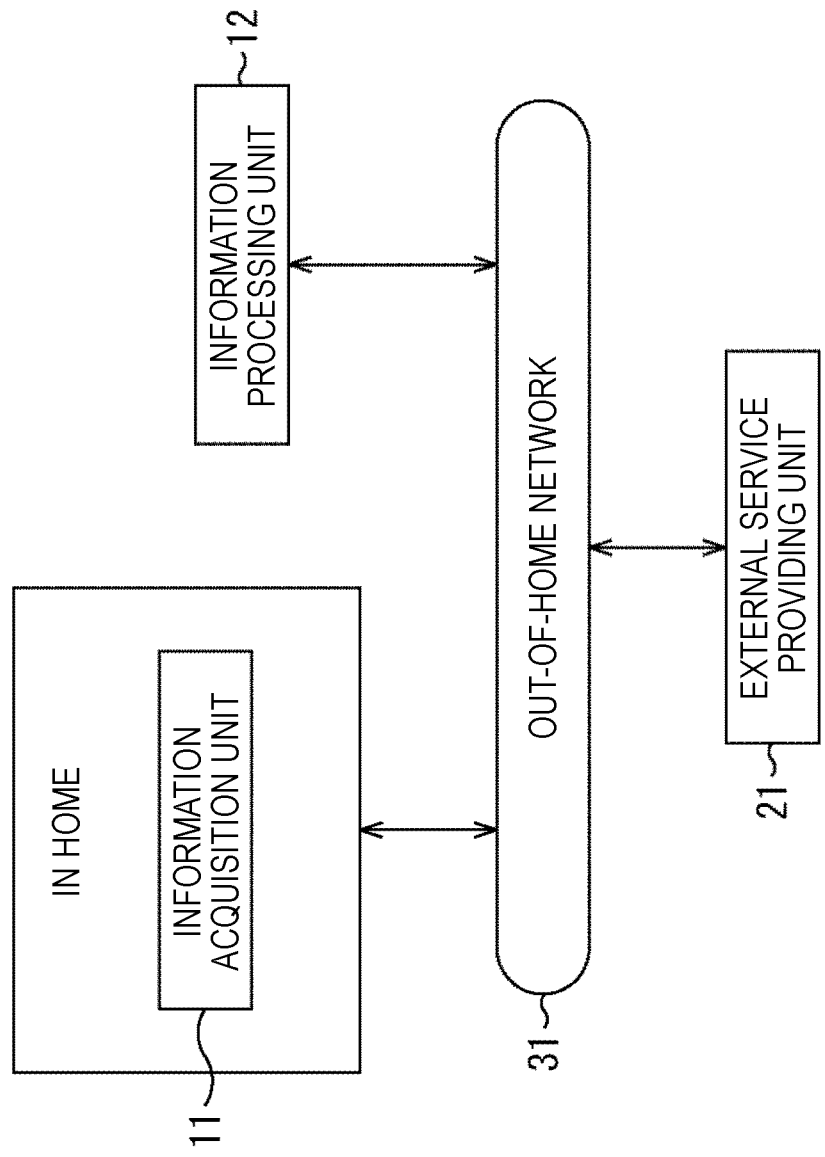
FIG. 2 is a diagram illustrating a configuration of another information processing system.
Figure 6:
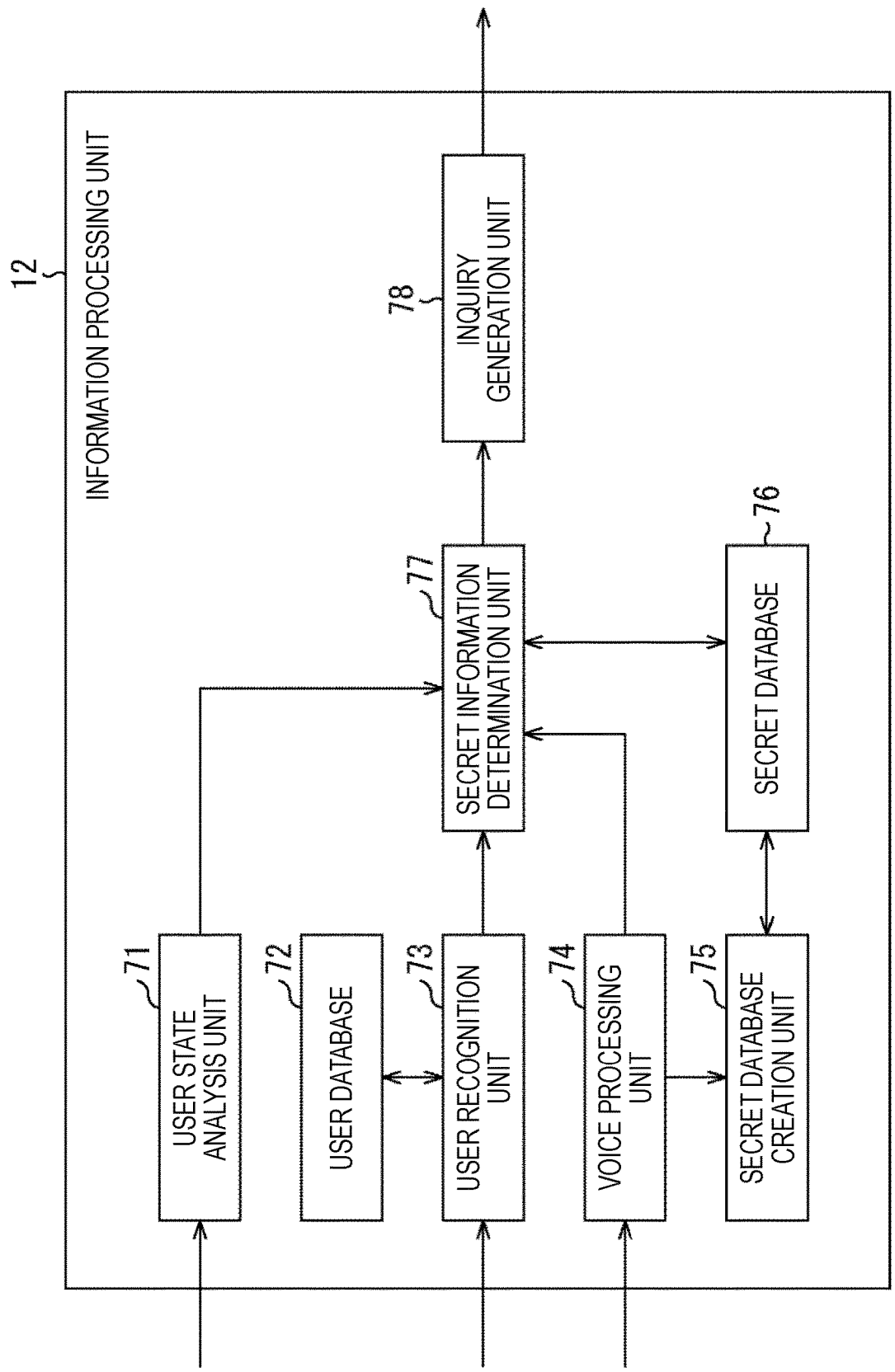
FIG. 6 is a diagram for describing a configuration of the information processing unit.

Note that, as illustrated in FIG. 2, in the case where the information acquisition unit 11 and the information processing unit 12 are configured to give and receive data to and from each other via the out-of-home network 31, a part of the information processing unit 12 illustrated in FIG. 6 may be installed in home.

In other words, a part or the whole (in the case of FIG. 1) of the information processing unit 12 can be installed in home. For example, the database for managing data such as the user database 72 and the secret database 76 may be installed in the home, and the other part may be installed outside the home.

Alternatively, the database for managing data such as the user database 72 and the secret database 76 may be a cloud, and the other part may be installed in the home.

Whether each part of the information processing unit 12 is installed in the home or outside the home can be appropriately changed.

The user state analysis unit 71 analyzes the state of the user, for example, talking or facing a direction of another user, using the information acquired by the user state acquisition unit 52. A analysis result is supplied to the secret information determination unit 77. Furthermore, although not illustrated, the analysis result is also supplied to the secret database creation unit 75 as necessary.

The user database 72 is a database for identifying the user. For example, information such as a user name (for example, a family name), an age, face data and voice data of the user for specifying the user, and the like are also stored as necessary. Furthermore, a schedule of the user, a friend list, and the like may be stored.

The user recognition unit 73 recognizes the user in a predetermined room, using the information acquired from the voice acquisition unit 51 or the user state acquisition unit 52 (FIG. 5) or by reference to the user database 72. A recognition result is supplied to the secret information determination unit 77. Furthermore, although not illustrated, the recognition result is also supplied to the secret database creation unit 75 as necessary.

The voice processing unit 74 semantically analyzes the voice acquired by the voice acquisition unit 51 (FIG. 5) and extracts keywords. A processing result (keywords) is supplied to the secret information determination unit 77. Furthermore, the processing result is also supplied to the secret database creation unit 75.

The secret database creation unit 75 creates the secret database 76. As described above, the secret database 76 is a database that accumulates information for determining whether or not the uttered content is the information (keyword) to be kept secret, and in which a flag is set for the keyword to be kept secret.

The secret database creation unit 75 registers the keyword extracted by the voice processing unit 74 to the secret database 76, determines whether or not the keyword to be registered is a keyword to be kept secret, and adds the flag.

As details will be described below, even in a case of the same keyword, the keyword may be kept secret and may not be kept secret depending on the user who has uttered the keyword. Therefore, the user recognized by the user recognition unit 73 is also used as information for making determination for setting the flag.

Furthermore, even in a case of the same keyword, the keyword may be kept secret and may not be kept secret depending on the gaze direction of the user who has uttered the keyword. Therefore, the state of the user analyzed by the user state analysis unit 71 is also used as information for making determination for setting the flag.

The secret information determination unit 77 determines whether or not a sentence (a question or the like) uttered by the user includes the secret information from the information from the user state analysis unit 71, the user recognition unit 73, and the voice processing unit 74, or by reference to the secret database 76, and supplies a determination result to the inquiry generation unit 78.

The inquiry generation unit 78 generates an inquiry on the basis of the determination result. In a case where the determination result indicates that the uttered sentence does not include the secret information, the inquiry generation unit 78 executes an inquiry to the external service providing unit 21. Further, in a case where the determination result indicates that the uttered sentence includes the secret information, the inquiry generation unit 78 executes an inquiry asking the user whether or not executing an inquiry to the external service providing unit 21.

For example, as described with reference to FIG. 3, when the user A issues a request "Tell me the weather in Okutama weekend", the voice processing unit 74 extracts the keywords such as the "weekend", the "Okutama", and the "weather", for example, and supplies the keywords to the secret information determination unit 77.

The secret information determination unit 77 confirms the flags of the keywords such as the "weekend", the "Okutama", and the "weather" by reference to the secret database 76, and outputs a determination result indicating that no flags are set (the keywords are not the secret information) to the inquiry generation unit 78. As a result, the inquiry generation unit 78 makes an inquiry about "the weather in Okutama weekend" to the external service providing unit 21.

Further, for example, as described with reference to FIG. 4, when the user A issues a request "Tell me the prognosis of the stage 3 of the cancer", the voice processing unit 74 extracts the keywords such as the "cancer", the "stage 3", and the "prognosis", for example, and supplies the keywords to the secret information determination unit 77.

The secret information determination unit 77 confirms the flags of the keywords such as the "cancer", the "stage 3", and the "prognosis" by reference to the secret database 76, and issues a determination result indicating that the flag is set for any of the keywords (there is the secret information) to the inquiry generation unit 78. As a result, the inquiry generation unit 78 executes an inquiry asking the user A whether an inquiry may be executed to the external service providing unit 21.

<Processing Example by Reference to Secret Database>

In the information processing system described with reference to FIGS. 3 and 4, the case of determining whether or not the secret information is included in response to the request (question) from one user, getting confirmation from the user on the basis of the determination, and making the inquiry to the external service providing unit 21, thereby protecting the privacy of the user has been described.

Moreover, description will be added to the processing of determining whether or not the secret information is included.

Figure 7:
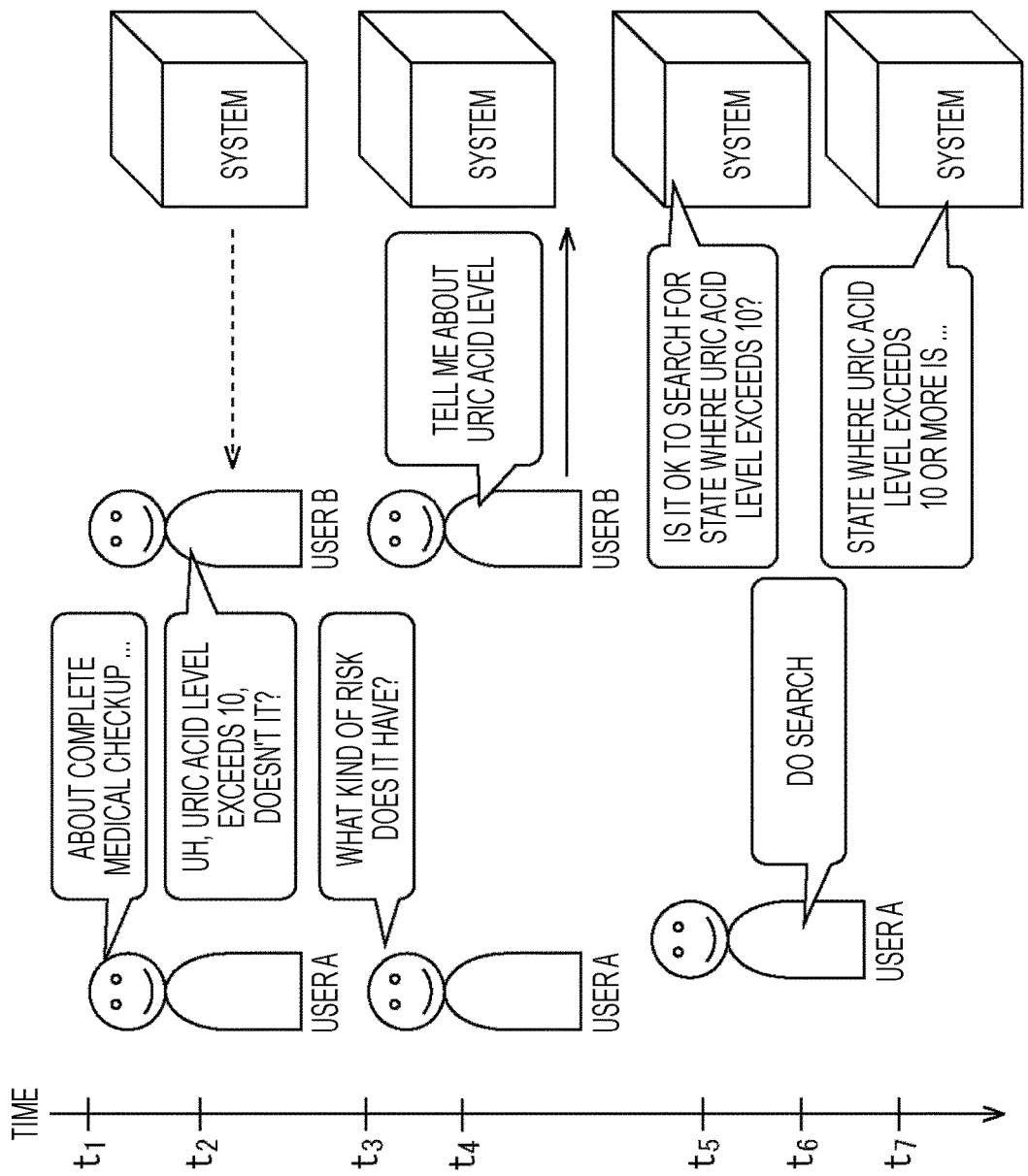
FIG. 7 is a diagram for describing an operation of the information processing system.

FIG. 7 is a diagram illustrating an example of a case of determining whether the secret information is included by reference to the secret database and performing processing based on a determination result.

At the time t1, the user A speaks to a user B "About complete medical checkup . . . ". In response to the speech, at the time t2, the user B says "Uh, the uric acid level exceeds 10, doesn't it?. At the time t3, the user A says to the user B "What kind of risk does it have?". In response to the question, the user B issues a request "Tell me the uric acid level" to the information processing system at the time t4.

The information of "the uric acid level exceeds 10" is considered to be the information regarding privacy of the user A. There is a possibility of leakage of the information regarding privacy by making an inquiry with the information regarding privacy to the external service providing unit 21. Therefore, confirmation as to whether or not an inquiry may be made to the external service providing unit 21 in the state including the information regarding privacy is performed to the user.

In other words, in the example illustrated in FIG. 7, at a time t5, the information processing system makes an inquiry about "Is it OK to search for the state where the uric acid level exceeds 10?" to the user. In response to such an inquiry, at a time t6, in a case where the user A or the user B gives permission "Do search", the information processing system executes the inquiry to the external service providing unit 21. As a result, at a time t7, the information processing system provides a search result "The state where the uric acid level is 10 or more . . . " to the user.

As described above, in a case where the information regarding privacy of the user is included, an inquiry about whether or not to make an inquiry to the outside is sent to the user, and the inquiry is made to the external service providing unit 21 when the inquiry is permitted.

On the other hand, although not illustrated, in a case where the user A (or the user B) does not give permission, saying "Don't search" at the time t6, the information processing system outputs a message indicating that the inquiry to the external service providing unit 21 is canceled to the user, for example, "I'm canceling the search for the uric acid level".

By the way, the determination as to whether or not such information regarding privacy is included is made with reference to the secret database 76. As described above, since the secret database 76 is a database that manages the keywords together with the flags indicating that the keywords are the information required to be kept secret, without making an inquiry to the external service providing unit 21, because the keywords are regarding the information regarding privacy of the user.

FIG. 8 illustrates an example of the secret database 76. The secret database 76 is provided with items such as "user", "topic", "keyword", "secret flag", and "update date and time", and manages the items in association with one another.

In the item of "user" of the secret database 76, information regarding the user who has uttered is written. In the item of "topic", a topic to which the keyword to be written in the item "keyword" belongs is written. In the item of "keyword", the keyword extracted from the monitored conversation is written.

In the item of "secret flag", information indicating whether or not the keyword written in the item "keyword" is the information required to be kept secret (information regarding privacy) is written. In the item of "update date and time", the date and time when the keyword written in the item "keyword" has uttered (the date and time when the keyword has been extracted from the monitored conversation) is written.

For example, referring to the first line of the secret database 76 illustrated in FIG. 8, information of "user A" is written in the item of "user", information of "health" is written in the item of "topic", information of "uric acid level" is written in the item of "keyword", information of "1" is written in the item of "secret flag", and information of "20160404 19:35" is written in the item of "update date and time".

In this case, the user A having uttered the keyword of the uric acid level at 19:35 on Apr. 4, 2016, the uric acid level corresponding to the topic of health and being the information required to be kept secret, and thus the secret flag being set to "1" can be read. Here, description will continue on the assumption that the secret flag indicates the information required to be kept secret in a case where the secret flag is "1", and the secret flag indicates information not required to be kept secret in a case where the secret flag is "0".

Note that the secret flag may indicate the information required to be kept secret in a case where the secret flag is "0", and the secret flag may indicate information not required to be kept secret in a case where the secret flag is "1". Further, the information to be kept secret is ranked, for example, information to be absolutely kept secret, information better to be kept secret, information to be kept secret by the user or the like, information not required to be kept secret, and the like are ranked, and information according to the ranks may be written in the item of the secret flag.

Such a secret database 76 is created by the secret database creation unit 75. When the conversation is monitored and a keyword is extracted, the secret database creation unit 75 writes the extracted keyword and information related to the keyword in the secret database 76. When the keyword is written, the topic information is acquired by reference to an external dictionary or an internal dictionary.

The secret flag is set according to the topic. For example, in a case where the topics are health, financial assets, security, and the like, keywords (information) included in these topics are considered to have a high possibility of the information regarding privacy. In this manner, the keyword belonging to the topic having a high possibility of the information regarding privacy is set to the information to be kept secret, and the secret flag is set to "1".

Furthermore, for example, in a case where the topics are place name, weather, food, and the like, the information included in these topics are considered to have a low possibility of the information regarding privacy. In this manner, the keyword belonging to the topic having a low possibility of the information regarding privacy is set to the information not to be kept secret, and the secret flag is set to "0".

Further, the secret flag may be set according to the user. For example, in a case where the user A is an adult (parent) and the user B is a child, different secret flags may be set to the keywords corresponding to the same topic.

For example, in the secret database 76 illustrated in FIG. 8, a keyword of "Ryokan" uttered by the user A corresponds to a topic of "travel" and the secret flag of "0" is set, whereas a keyword of "camp" uttered by the user B corresponds to the topic of "travel" but the secret flag of "1" is set.

In this manner, the different secret flags may be set by the user even within the same topic, in other words, the secret flags may be set depending on the user.

Furthermore, although not written as an item in FIG. 8, an item of "room" may be provided, and the secret flag may be set depending on a place where a keyword is uttered. As details will be described below, for example, content talked in the living room or the like may be set to the information not to be kept secret (the secret flag=0), and content talked in the bedroom and the like may be set to the information to be kept secret (the secret flag=1).

Of course, the secret flag may be set according to any of conditions such as the topic, user, and place, or may be set from a comprehensive point of view about the plurality of conditions.

Since the secret database 76 is created by monitoring a conversation, semantically analyzing the monitored conversation, and extracting the keywords, the creation (addition, update, and the like of new keywords) is performed when monitoring the conversation. Furthermore, whether or not the keywords are the secret information is determined by confirming a past history. As will be described below with reference to FIG. 9, the secret flag of the secret database 76 is updated when a predetermined condition is satisfied.

FIG. 7 is referred to again. At the time t4, the user B has issued the request "Tell me the uric acid level" to the information processing system. At this time, the information processing system determines whether or not the keyword of "uric acid level" is the secret information by reference to the secret database 76 (for example, see FIG. 8).

In a case of referring to the secret database 76 illustrated in FIG. 8, the secret flag for the keyword of "uric acid level" being "1", in other words, being set to the secret information is read. In this case, the "uric acid level" is associated with the user A but the users having the conversation are the user A and the user B. Therefore, the database regarding the user A and the user B is referred to.

In this manner, the secret database 76 is created and referred to so as to determine whether or not keywords are the secret information.

Note that, here, description will continue assuming that the keywords (information) extracted from the monitored conversation are written in the secret database 76. Moreover, the concept may be expanded with words similar to the keyword to be written, thesaurus, and the like, and related words (keywords) may be written in the secret database 76.

Processing when the secret level is changed (the secret flag is changed) will be described with reference to FIG. 9. As a premise, a conversation as described with reference to FIG. 7 has been held between users prior to a conversation as will be described with reference to FIG. 9, and keywords extracted from the conversation at that time are accumulated in the secret database 76.

At the time t1, the user A speaks to the user B "About complete medical checkup . . . ". At the time t2, the user B asks the user A "How was it this year?" At the time t3, the user A says "I will be re-checked for uric acid level again". At the time t4, the user B issues a request "Look for advisors for adult diseases" to the information processing system.

The information processing system monitors the conversation from the time t1 to the time t3, and extracts keywords such as "complete medical checkup", "uric acid level", "re-check", for example. At the time t5, the information processing system notifies the user A of a message "I'm looking for advisors with knowledge of uric acid level abnormality" in response to the request of "Look for advisors for adult diseases" from the user B.

The information processing system complements the information "uric acid level" to issue such a message. Referring to FIG. 8, in the secret database 76, the "uric acid level" is set to 1 as the secret flag and is the secret information.

Referring again to FIG. 7, at the time t5 and the time t6, the user A has replied "Do search" in response to the question "Is it OK to search for the state where the uric acid level exceeds 10?" from the information processing system. That is, in this case, the user A permits provision of the information "uric acid level" set to the secret information to the external service providing unit 21, in the secret database 76.

In this way, the secret flag is changed for the keyword that is permitted to be provided to the external service providing unit 21 (permitted to be output to the outside). That is, in this case, the secret flag is changed from "1" to "0". With such change, the secret database 76 illustrated in FIG. 10 is obtained. In other words, in the secret database 76 illustrated in FIG. 10, the secret flag of the keyword of the "uric acid level" is reset to "0", and the update date and time is updated to "20160725 20:24".

Figure 9:
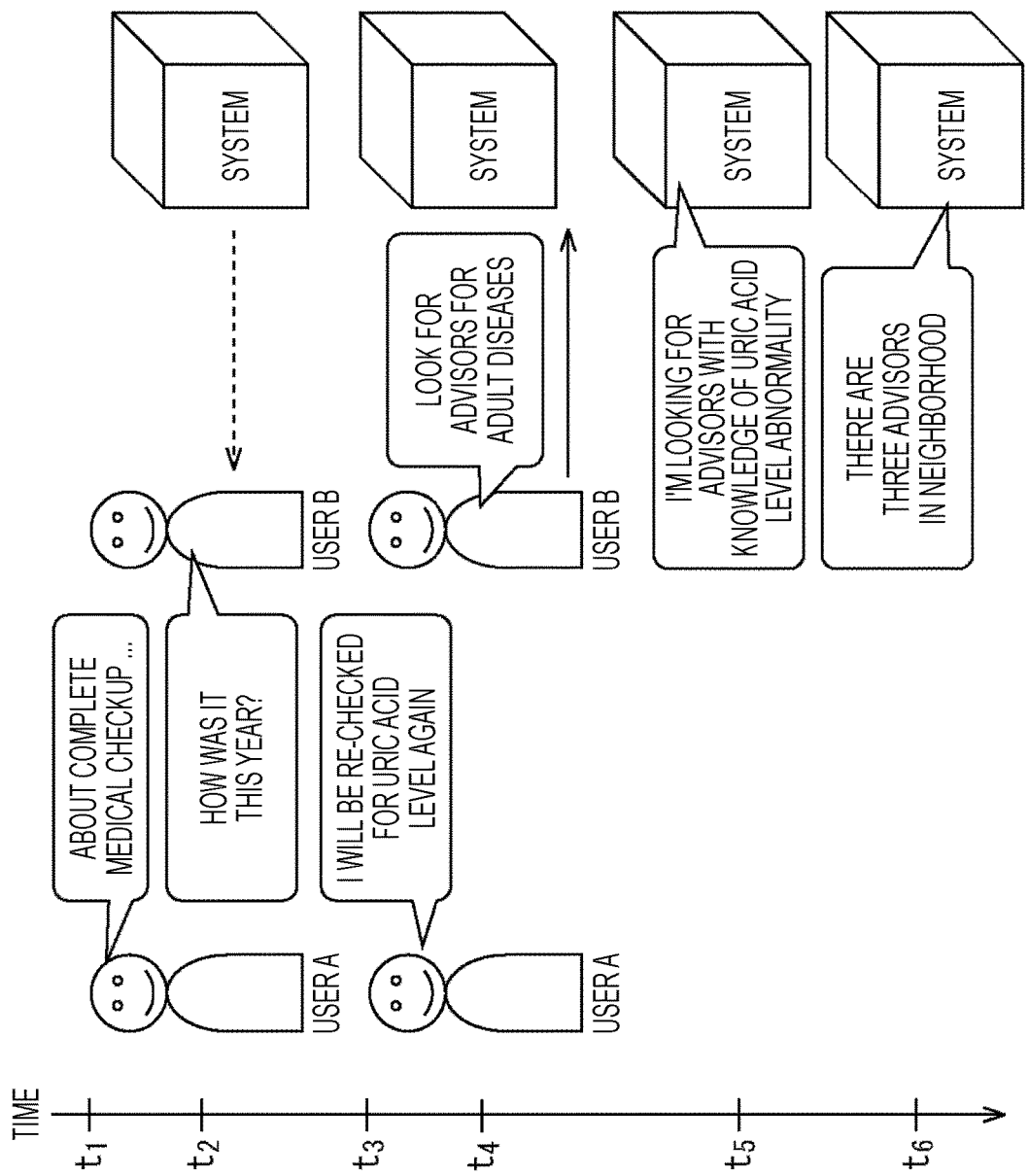
FIG. 9 is a diagram for describing an operation of the information processing system.

Returning to the description with reference to FIG. 9. At the time t5, since the information processing system performs processing by reference to the secret database 76 illustrated in FIG. 10, the information processing system determines that the keyword of the "uric acid level" is not the secret information, supplies the information of the "uric acid level", generates the message "I'm looking for advisors with knowledge of uric acid level abnormality", and notifies the user of the message.

The information processing system makes an inquiry about "advisors with knowledge of uric acid level abnormality" to the external service providing unit 21 while notifying the user of such a message. This inquiry is made without obtaining permission from the user. Then, at the time t6, the information processing system notifies the user of a search result "There are three advisors in the neighborhood".

As described with reference to FIGS. 7 to 10, the secret database 76 is created and referred to, and management of the secret information, such as the secret information being not output, or output after permission is obtained from the user, at the time of an inquiry to the external service providing unit 21, for example, is performed.

Further, in the secret database 76, the information, for which permission to be output to the outside has been obtained from the user, is appropriately updated to be excluded from the secret information afterward, and therefore the secret database 76 can be optimized to be suitable for the user.

Note that, for example, at the time t4 in FIG. 9, the request of "Look for advisors for adult diseases" has issued from the user B to the information processing system. However, even if such a request is not issued, the information processing system may execute an inquiry to the external service providing unit 21 and provide information related to the "uric acid level" to the user, for example.

In other words, in a case where there is a history of inquiries to the outside in the past, an inquiry to the external service providing unit 21 may be executed even if there is no request from the user.

<Case 1 of Acquiring Information from Conversation>

In the information processing system described with reference to FIGS. 3 and 10, the case of determining whether or not the secret information is included in response to the request (question) from one user, getting confirmation from the user on the basis of the determination, and making the inquiry to the external service providing unit 21, thereby protecting the privacy of the user has been described.

Next, a case of protecting the privacy of the user and further adding information to provide more useful information to the user will be described.

A case of collecting information from a conversation and supplementing information will be described with reference to FIG. 11. At the time t1, the user A speaks to the user B "This weekend . . . ". At the time t2, the user B replies to the user A that "Uh, you mean the camp at Okutama, don't you?" in response to the speech. As continuation of the conversation, at the time t3, the user A replies to the user B that "I'm worried about the weather".

Then, at the time t4, the user B issues a request "Tell me the weather" to the information processing system. The conversation from the time t1 to the time t3 is a conversation held between the user A and the user B but the conversation at the time t4 is a conversation held between the user B and the information processing system. In this way, the information processing system starts collection of supplemental information at the time when a request is issued to the information processing system.

The information processing system monitors the conversation between the user A and the user B from the time t1 to the time t3, and cuts out keywords. For example, the voice acquisition unit 51 of the information acquisition unit 11 always acquires the voice and outputs the voice to the information processing unit 12. The voice processing unit 74 of the information processing unit 12 analyzes voice data supplied from the voice acquisition unit 51 and extracts keywords. The extracted keywords are stored in the secret database 76.

Note that acquisition of the voice by the voice acquisition unit 51 may be started with detection of entrance of the user into the room as a trigger from the information acquired by the user state acquisition unit 52.

In this way, the conversation held in a period from a point of time when the conversation is started to when the user issues a request to the information processing system is monitored, extracted for keywords, and recorded, but processing using the keywords (information) is in an unexecuted state.

Then, at the point of time when the user issues the request to the information processing system, information necessary for satisfying the request from the user is collected back to the conversation before the request. In the case of the example illustrated in FIG. 11, the user B has issued the request "Tell me the weather", but information of which date and which place of the weather are missing in this request.

At the time t1, the information processing system acquires information regarding date and time of "this weekend" from a keyword of "this weekend" uttered by the user A. Further, at the time t2, the information processing system acquires information regarding a place of "Okutama" from the keyword of "Okutama" uttered by the user B.

In this manner, the information necessary for satisfying the request issued from the user is collected from the information before the request from the user is issued. Then, in the example illustrated in FIG. 11, at the time t5, the information processing system generates a message "I'm checking the weather in Okutama this weekend" and notifies the users A and B of the message. With the notification of such a message, whether there is no mistake in the captured insufficiency part (in this case, the date and time and place) can be confirmed.

Furthermore, with the notification of such a message, notification of an inquiry being to be made to the external service providing unit 21 from now can be provided to the users A and B, and in a case where the privacy information is included in the message of "I'm checking the weather in Okutama this weekend", the users can recognize that the privacy information is included and there is a possibility that the privacy information is output to the outside.

In a case where the user A or the user B listens to the message and determines that there is a mistake or determines that the privacy information is included, the user A or the user B can issue, to the information processing system, an instruction to cancel the inquiry to the external service providing unit 21.

For example, in a case where the user issues a request "Cancel the inquiry", the inquiry to the external service providing unit 21 is canceled. Further, in a case where the user issues a new request "Tell me the weather in Tokyo today", the previous request "Check the weather in Okutama this weekend" is canceled, and an inquiry about the new request is made.

Figure 11:
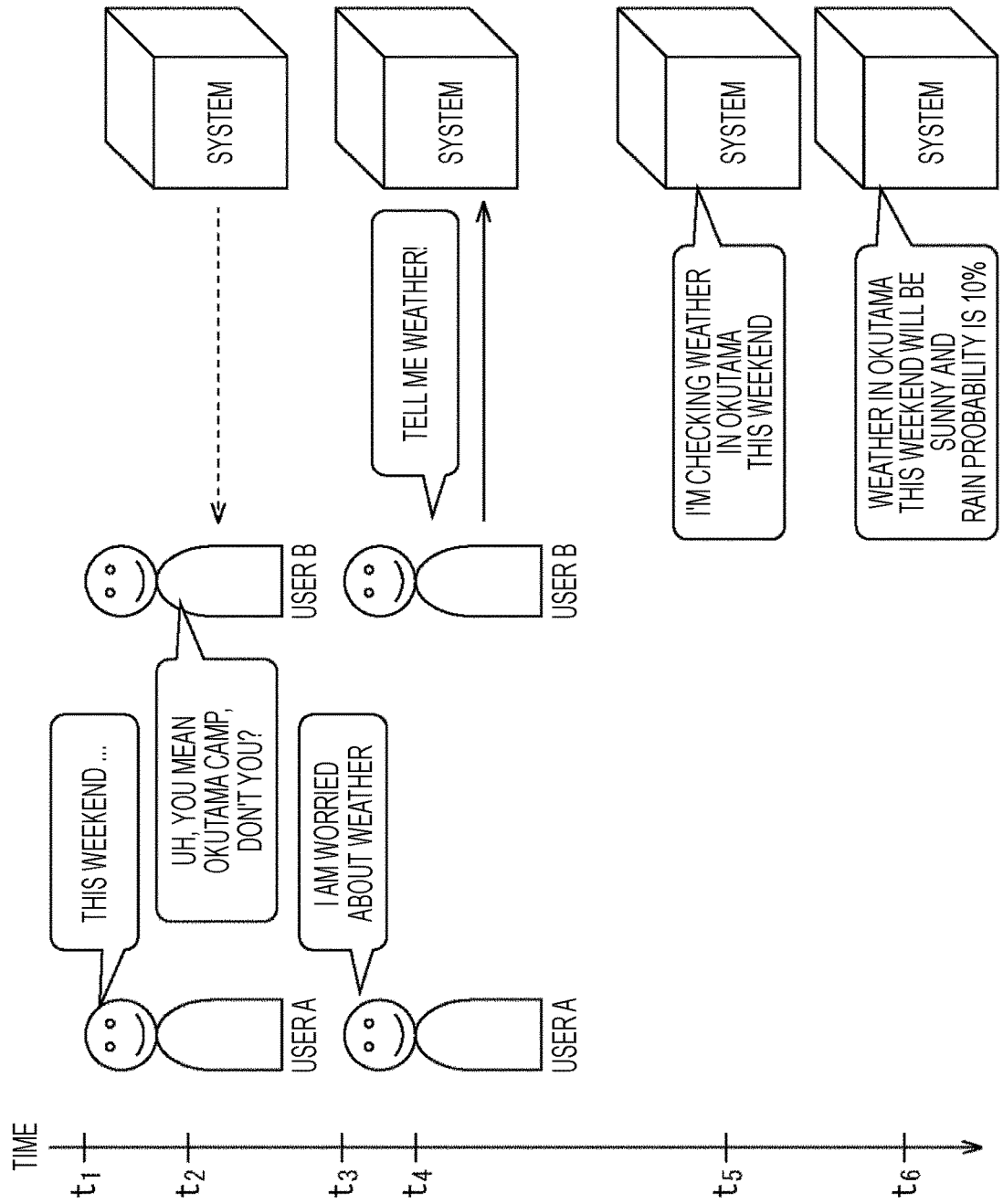
FIG. 11 is a diagram for describing an operation of the information processing system.

In the example illustrated in FIG. 11, the instruction to cancel the inquiry to the external service providing unit 21 by the user is not issued, and thus the inquiry of "I'm checking the weather in Okutama this weekend" is made to the external service providing unit 21. As a result of the inquiry, at the time t6, information of "The weather in Okutama this weekend will be sunny and the rain probability is 10%" is provided to the users A and B.

Figure 3:
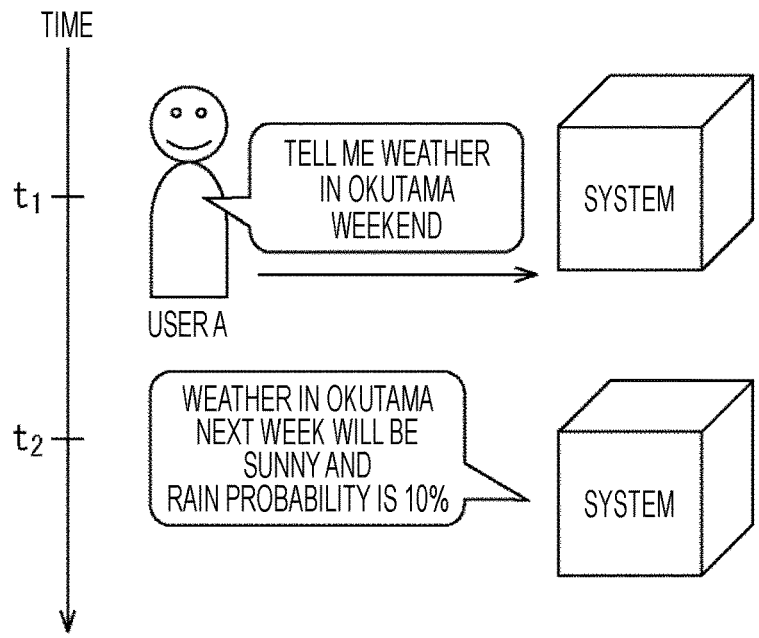
FIG. 3 is a diagram for describing an operation of the information processing system.

In the example illustrated in FIG. 11, the case in which the information to be kept secret is not included has been exemplarily described, as in the example illustrated in FIG. 3. Even in the example illustrated in FIG. 11, the inquiry to the external service providing unit 21 is confirmed to the user (the message is issued at the time t5), as described above. Therefore, the privacy information can be prevented from being output when the user does not intend.

Figure 4:
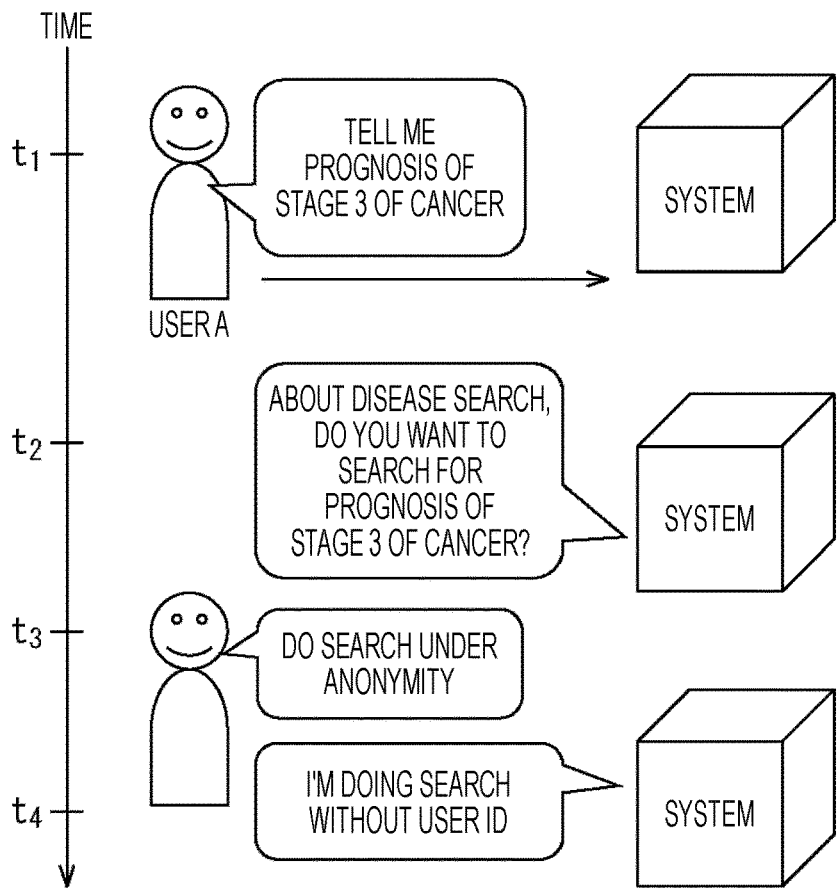
FIG. 4 is a diagram for describing an operation of the information processing system.

In a case where the information to be kept secret is included, as in the example illustrated in FIG. 4, whether or not an inquiry may be made to the external service providing unit 21 is confirmed to the user. That is, for example, in the example illustrated in FIG. 11, in a case where it is determined that the information required to be kept secret is included in the inquiry when the inquiry of "the weather in Okutama this weekend" is made, the message from the information processing system to the user at the time t5 is a message seeking permission of the user, such as "Is it OK to check the weather in Okutama this weekend", for example.

In a case where the user replies to such a message, the inquiry to the external service providing unit 21 is made in response to the reply.

In this way, the conversation (utterance) of the users is always recorded, and information necessary for the inquiry is supplemented using the recorded information as necessary, whereby the reply to the request of the user can be made more accurate.

For example, in the example illustrated in FIG. 11, there is a possibility of replying a response not desired by the user, such as "The weather today is sunny" to the user, for example, if supplementation is not performed. According to the present technology, such a response is prevented, and a response desired by the user can be replied, as described above.

Also in this case, the information regarding privacy of the user can be prevented from being leaked to the outside, as described above.

Note that FIG. 11 illustrates the example in which information is supplemented. However, a configuration not to supplement information by setting of the user or not to supplement information when the user does not intend may be adopted. Such a case will be described with reference to FIG. 12.

The conversation held among the user A, the user B, and the information processing system from the time t1 to the time t4 is similar to the conversation held among the user A, the user B, and the information processing system from time t1 to the time t4 illustrated in FIG. 11.

When the user B issues a request "Tell me the weather" to the information processing system at the time t4, the information processing system replies "Which date and place of weather do you want to check?" at the time t5. In this case, information is not supplemented, and thus information regarding the place and date and time are insufficient, and the message asking the user about the insufficient information is issued from the information processing system.

Even in a case where there is insufficient information, as described above, a configuration to directly ask the user without supplementing information can be adopted.

Furthermore, in this case, not supplementing information can be set although the conversation itself is always monitored and recorded. That is, as described with reference to FIG. 11, the conversation between the user A and the user B at the time t1 to the time t3 is monitored and keywords are extracted, for example. However, the information can be configured not to be used for supplementation or the like in a state where permission is not given from the user.

Whether or not to use information for supplementation, whether or not to record the conversation, and the like can be set by the user, whereby a system reflecting the intention of the user can be constructed.

Figure 12:
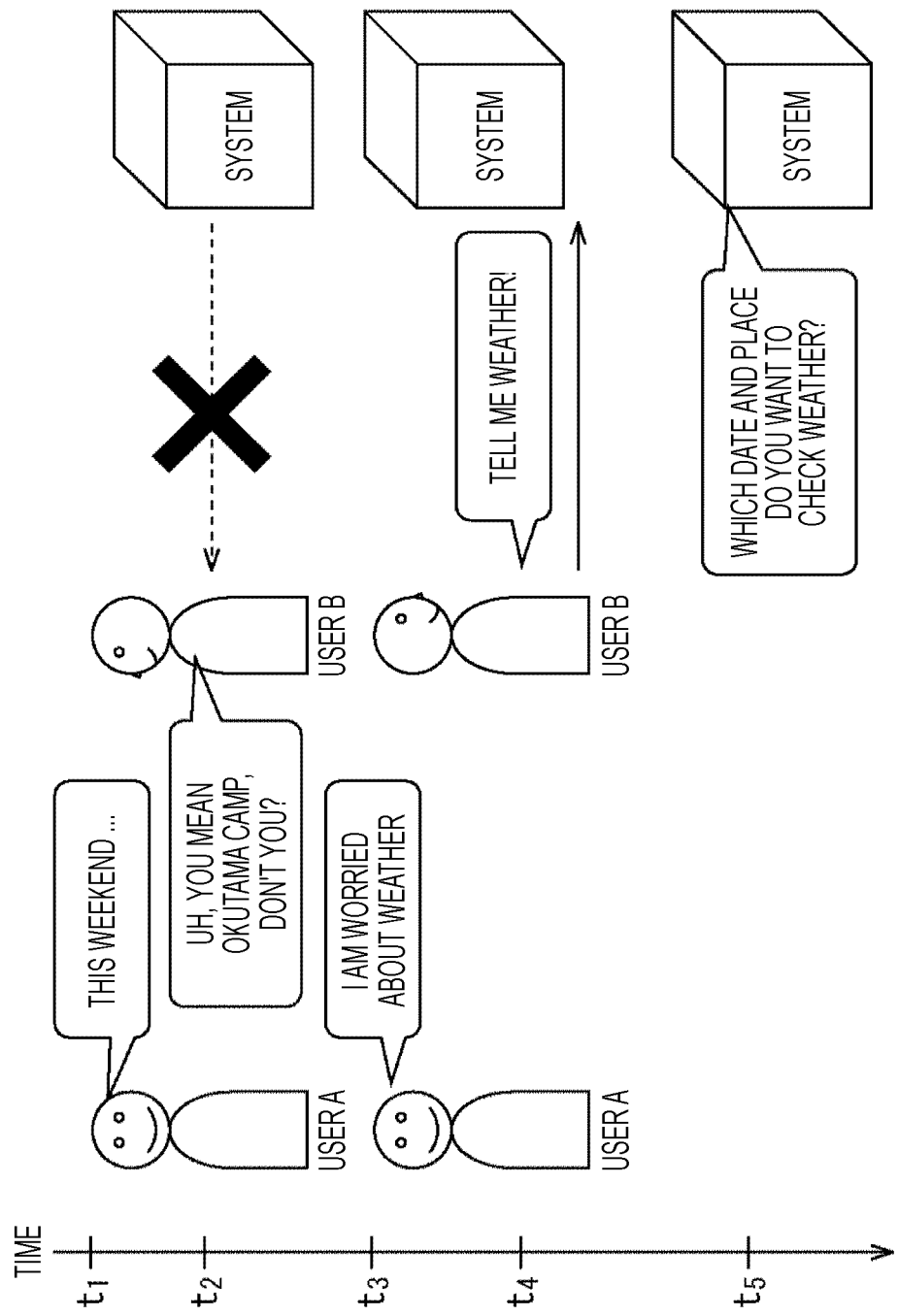
FIG. 12 is a diagram for describing an operation of the information processing system.

Furthermore, the conversation may be monitored only when it can be determined that the user explicitly instructs the information processing system to record the conversation. Referring to FIG. 12, it is assumed that when the user A and the user B are having a conversation from the time t1 to the time t3, the user A and the user B are having the conversation, not facing the information processing system (the voice acquisition unit 51).

In this way, when the user's gaze and body do not face the information processing system, the user wishes not to be monitored for the conversation, and the information processing system does not monitor the conversation. In other words, when it can be determined that the user instructs the information processing system to monitor the conversation, such as the user facing the information processing system, the conversation of the user may be monitored.

When the user's gaze and body do not face the information processing system and the conversation is not monitored, supplementation of information is not performed.

In this way, whether or not to monitor the conversation and whether or not to supplement information as necessary in the case of monitoring the conversation can be set by the user, so that the information processing system reflecting the intention of the user can be constructed.

<Case 2 of Acquiring Information from Conversation>

Figure 13:
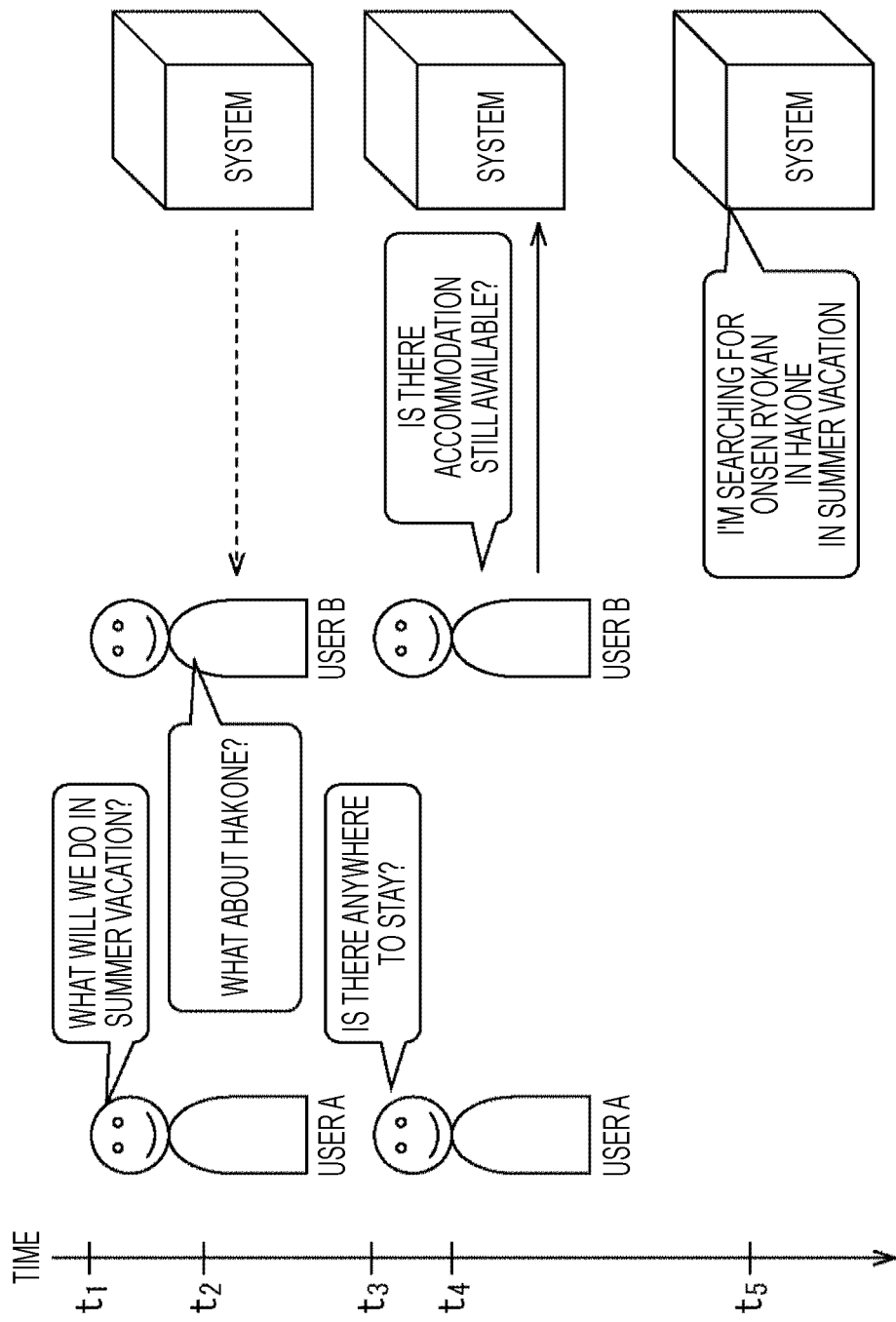
FIG. 13 is a diagram for describing an operation of the information processing system.

Next, a case of acquiring information from a conversation will be described with reference to FIG. 13. The example as will be described with reference to FIG. 13 is, basically, monitoring a conversation, extracting information (keywords), recording the information, and reading and supplementing the recorded information as necessary, as in the example described with reference to FIG. 11. FIG. 11 illustrates the example in which the information to be supplemented is information extracted from a previous conversation. FIG. 13 is different in that the information to be supplemented is not limited to the previous conversation and is information extracted in the past (information different from the information extracted from the previous conversation).

Referring to FIG. 13, at the time t1, the user A asks the user B "What will we do in the summer vacation?". At the time t2, the user B replies "What about Hakone?" to the question. At the time t3, the user A asks "Is there anywhere to stay?". In response to the question, at the time t4, the user B issues a question (request) of "Is there accommodation still available?" to the information processing system.

The information processing system extracts the information of the place and date and time from the conversation between the user A and the user B from the time t1 to the time t3 and supplements the information, as in the case described with reference to FIG. 11. That is, the information processing system acquires information of "Hakone" as the place and acquires information of "summer vacation" as the date and time.

With the acquisition of such information, the information processing system can create a message of "I'm searching for accommodations in Hakone in the summer vacation". Further, in a case where the information processing system can guess the user A and the user B (the family including the user A and the user B) prefer to reserve Onsen Ryokans from the past information, the information processing system includes such information to the inquiry message.

As a result, as illustrated in FIG. 13, at the time t5, the information processing system creates the message of "I'm searching for Onsen Ryokans in Hakone in the summer vacation" and notifies the user B of the message. The keyword of "Onsen Ryokan" in the message is information acquired (guessed) from the past information.

This past information is information accumulated by recording and analyzing the conversation (conversation content) exchanged between users on a daily basis. Furthermore, not only the conversations but also user's schedules (including a schedule for the future but also a schedule in the past), action histories, and the like are also accumulated and analyzed, and accumulated as information, whereby such information can be used as the past information, for example.

In this manner, information regarding the user, for example, preference information, behavior patterns of daily life, and the like, is acquired from various types of information (voices, images, schedules, and the like), analyzed, and accumulated, and the accumulated information can be read as necessary and used as the information to be supplemented.

In a case where such supplementation is not performed in the example illustrated in FIG. 13, the message of "I'm searching for accommodations in Hakone in the summer vacation" is provided to the user and an inquiry is made to the external service providing unit 21. However, with the search condition of the "accommodations in Hakone", a large number of accommodations are obtained, and the information amount to be provided to the user may become large.

However, according to the present technology, the information of the "Onsen Ryokan" is accumulated in the user database as the preference information of the user and the information is used. Therefore, as described above, the message of "I'm searching for Onsen Ryokans in Hakone in the summer vacation" is provided to the user, and an inquiry can be made to the external service providing unit 21. Therefore, not only the search condition of "accommodations in Hakone" but also the condition of "Onsen Ryokans" is added. Therefore, the number of accommodations can be narrowed down, and the information amount to be provided to the user can be narrowed down to an appropriate amount.

Further, since such information (preference information or the like) differs in each user (each family), in a case where the conversation as illustrated in FIG. 13 is held in another family, the message generated by the information processing system may be a message of "I'm searching for resort hotels in Hakone in the summer vacation" or "I'm searching for cheap accommodations in Hakone in the summer vacation", for example. Therefore, according to the present technology, information for search suitable for the user (family) can be appropriately supplemented.

Further, not only one but also a plurality of pieces of information to be supplemented may be adopted. For example, in the above example, the example of supplementing one piece of information of "Onsen Ryokan" has been described. However, for example, a plurality of pieces of information such as "Onsen Ryokan", "seafood dish", and "cheap" is supplemented, and a message of "I'm searching for cheap Onsen Ryokans famous for seafood dish in Hakone in the summer vacation" is created, and the search may be conducted.

Note that the information such as the preference information of the user is accumulated in the secret database 76 with flags, whereby, if the keyword of the "Onsen Ryokan" is set as the secret information, such secret information can be prevented from being leaked to the outside, similarly to the above-described case.

For example, in a case where the user often goes to "a recreation facility of a company A", and thus information of "the recreation facility of the company A" is stored in the secret database 76, there is a possibility that the "company A" corresponds to the privacy information of the user and is managed with a flag for treating the information as the secret information.

In such a case, the conversation as illustrated in FIG. 13 is held, and at the time t5, the information processing system supplements the information and creates a message of "Is it OK to search for vacancy information of the facility of the company A in the summer vacation" as the message to be presented to the user, for example.

As described with reference to FIG. 4, in a case where the secret information is included, whether or not an inquiry may be made to the external service providing unit 21 is asked to the user, and the inquiry is made when permission is obtained. Therefore, even in a case where the past information as described with reference to FIG. 13, for example, the preference information of the user is used as supplementary information, the inquiry to the external service providing unit 21 in which the privacy of the user is protected can be made.

Figure 14:
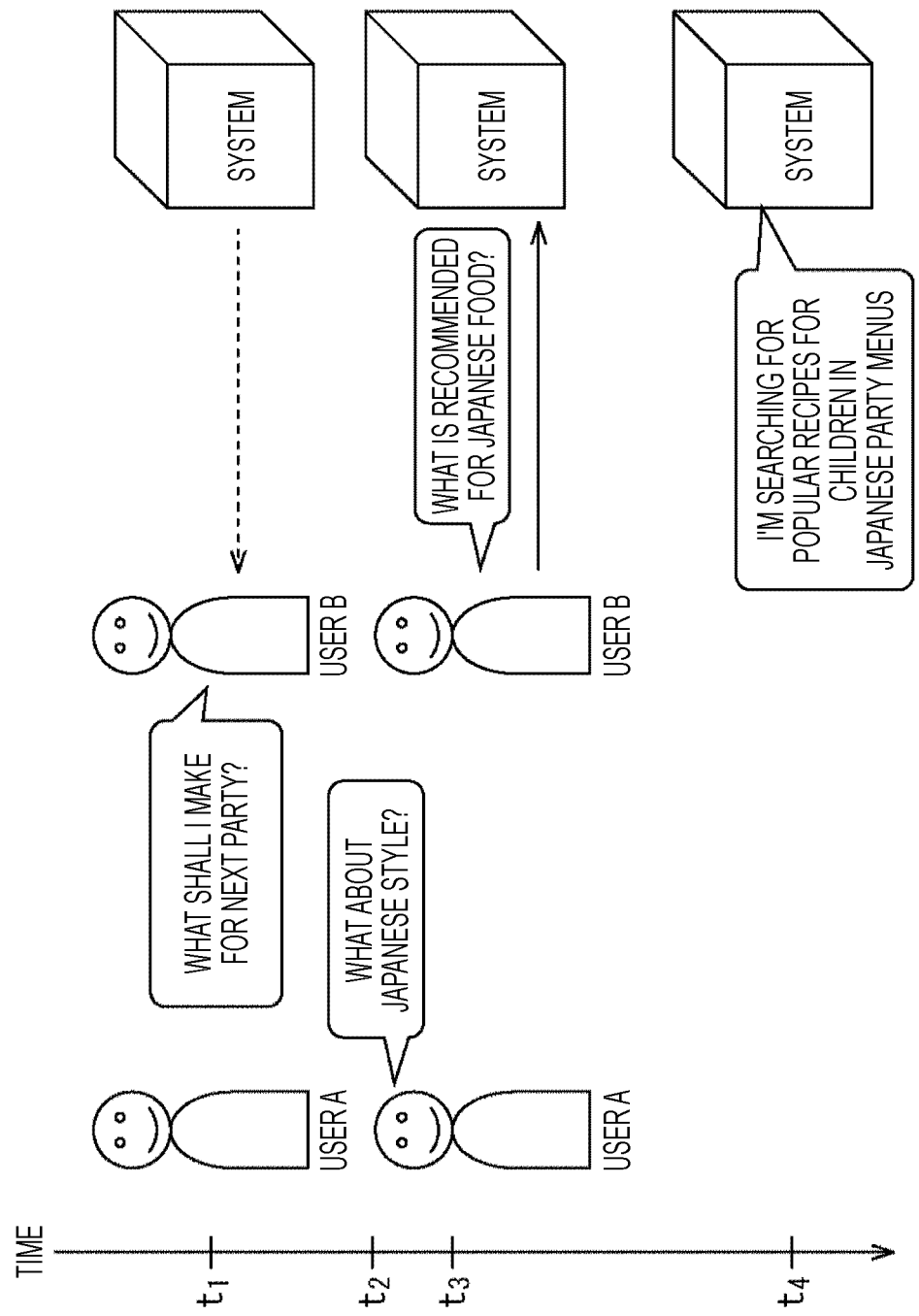
FIG. 14 is a diagram for describing an operation of the information processing system.

FIG. 14 illustrates a case of acquiring information from a conversation, as in the case with reference to FIG. 13, and another example of generating a message using another information and making an inquiry to the external service providing unit 21 will be described.

Description will continue assuming that a schedule of the user and a friend list of the user are recorded in the secret database 76 or the user database 72 as another information, and the recorded information is used. Here, description will continue assuming that the schedule and the friend list are stored together with information for identifying the user in the user database 72 in association with one another.

In the user database 72, as the schedule of the user B, it is assumed that information of a party with Mr. and Ms. X and Mr. and Ms. Y on August 8 is recorded.

Further, in the user database 72, as the friend list of the user B, it is assumed that information of Mr. and Ms. X (the couple, a junior high school girl, and an elementary school boy)

Mr. and Ms. Y (the couple and an elementary school boy) is recorded.

Referring to FIG. 14, at the time t1, the user B asks the user A "What shall I make for the next party?". In response to this question, at the time t2, the user A replies "What about Japanese style?". At the time t3, the user B issues a question (request) of "What is recommended for Japanese food?" to the information processing system.

The conversation so far is monitored by the information processing system, and keywords such as "party", "what shall I make", and "Japanese style" are extracted. The information processing system obtains information that the purpose of use is the "party" from these keywords and the question of "What is recommended for Japanese food?" from the user B, and the search is not a search for places to go and eat such as restaurants but a search for recipes for cooking from the keyword of "What shall I make".

As a result, the information processing system supplements information such as the "party" and the "recipe", and guesses "to search recommended recipes of Japanese food at the party". Furthermore, referring to the schedule managed in the user database 72, the information processing system recognizes that the party is the party to be held on August 8, which Mr. and Ms. X and Mr. and Ms. Y attend. Moreover, referring to the friend list managed in the user database 72, the information processing system recognizes that Mr. and Ms. X have two children and Mr. and Ms. Y have one child.

As a result of such recognition, the information processing system recognizes that many children will attend the party. As a result of supplementation of such information, at the time t4, the information processing system notifies the user of a message of "I'm searching for popular recipes for children in Japanese party menus" Thereafter, if the user does not cancel the message, the inquiry of the "popular recipes for children in Japanese party menus" is made to the external service providing unit 21.

If supplementation of information is not performed in the information processing system, the inquiry of "What is recommended for Japanese food?" is made to the external service providing unit 21. Therefore, various "Japanese food" related information such as Japanese restaurants, Japanese recipes, and Japanese souvenirs are searched for and presented to the user, for example.

However, according to the present technology, in the above-described example, the information for the purpose of use and the target is supplemented from the conversation between the users, the information of the number of attendees, ages of attendees, and the like is acquired from the schedule and the friend list, guess is made from the acquired information, and a guessed result is further supplemented as information. Therefore, information desired by the user can be more accurately detected and provided.

Furthermore, the information such as the number and ages of attendees is acquired from the schedule and the friend list, and the guess is performed from the acquired information, but the privacy information such as the schedule and the friend list is not used as it is. Therefore, the privacy information is not provided to the external service providing unit 21, and search with protected privacy can be performed.

<Secrecy by People>

In the present technology, as described above, the conversation is monitored, the keywords and the like are extracted, and the extracted keywords are used as the supplementary information at the time of an inquiry to the external service providing unit 21. In a case of monitoring a conversation, there may be a case of monitoring a conversation and a case of not monitoring a conversation depending on a user.

For example, as described with reference to FIG. 15, in a case of a conversation between children, it is possible that the conversation is not monitored and supplementation of information or the like is not performed. Furthermore, for example, as will be described with reference to FIG. 16, it is possible that a conversation between a family member and a person other than the family members (hereinafter, a guest) is not monitored and supplementation of information or the like is not performed.

An example of not monitoring a conversation in a case of a conversation between children will be described with reference to FIG. 15. Note that, here, children will be described as an example. However, this embodiment is applicable to users with low judgment capability, who require judgment by an adult, such as children and elderlies.

At the time t1, a child A asks a child B about a question "Where are we going in the summer vacation?". At the time t2, the child B replies "to camp". At the time t3, the child A asks a question "How are we going?". In response to this question, the child B issues a request "Tell me how to get there" to the information processing system.

The user recognition unit 73 (FIG. 6) of the information processing unit 12 refers to the user database 72 and specifies the users in conversation from the information acquired by the user state acquisition unit 52 (FIG. 5), for example, from image data. In the user database 72, for example, image data of the child A is stored. The image data and acquired image data are matched, whereby the child A is specified. Furthermore, specification is similarly performed for the child B.

From the frequency of a voice acquired by the voice acquisition unit 51 or the like, whether the user is a child or an adult may be specified.

Further, if the child A is a guest and in a case where the child A is not registered as the user in the user database 72, the child A is not specified as the user as a result of matching. Therefore, such an unspecified user may be processed as a guest. Then, as described below, in this case, the guest is treated as a child and it can be set not to monitor conversation and the like.

Figure 15:
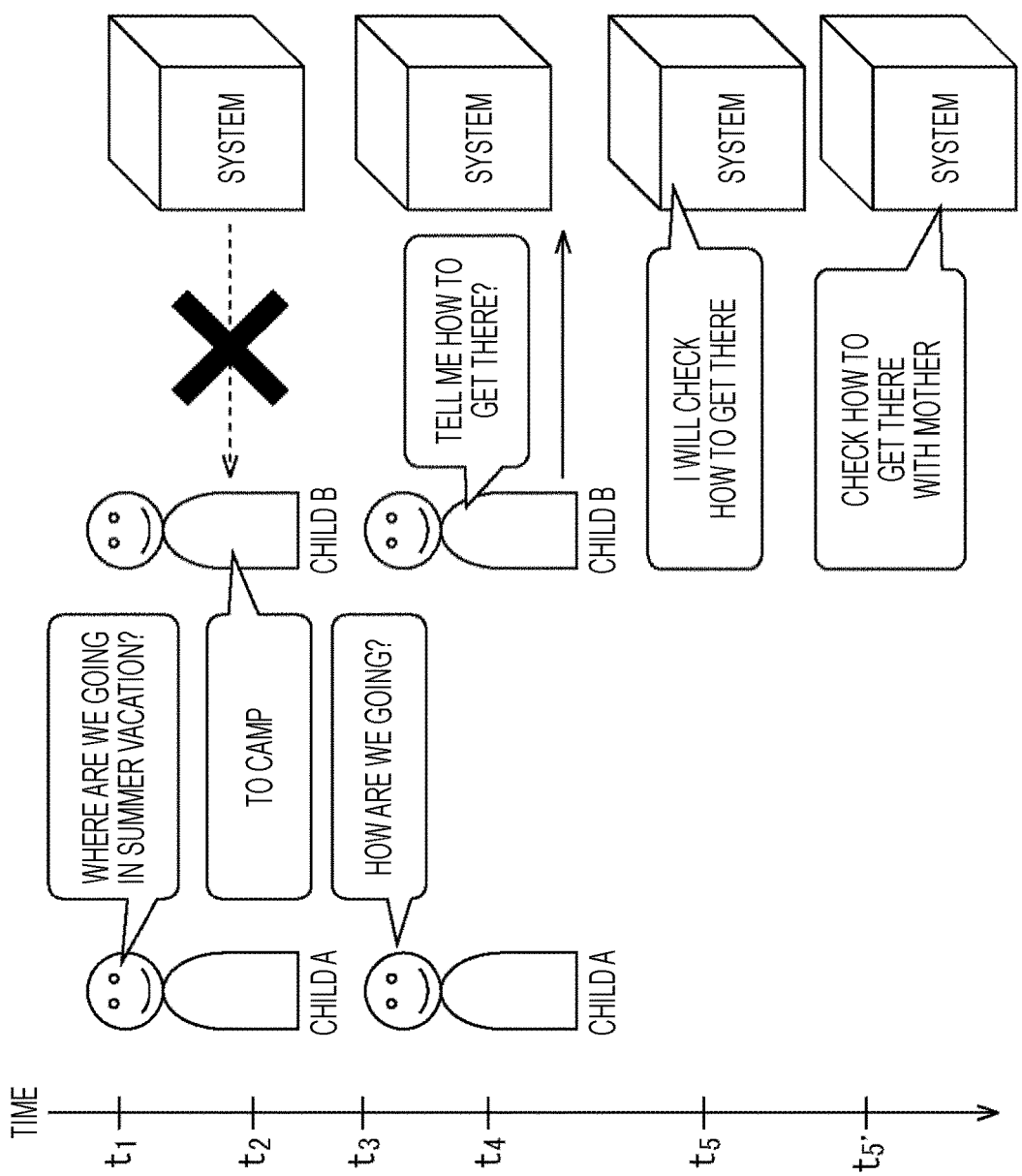
FIG. 15 is a diagram for describing an operation of the information processing system.

In a case where the case described with reference to FIG. 13 or 14 is applied to the case in the situation as illustrated in FIG. 15, keywords such as "summer" and "camp" are extracted from the conversation held between the child A and the child B from the time t1 to the time t4, for example, and the extracted keywords are used as the supplementary information as necessary. Furthermore, the user database 72 is referred to, and a destination, a day for departure, and the like are read from the schedule of the child B, and are used as the supplementary information as necessary.

However, in a case of a conversation between children, in a case of setting of not monitoring a conversation is set, such supplementation of information is not performed. Therefore, the information processing system replies "I will check how to get there" at the time t5, for example. Alternatively, the information processing system replies "Check how to get there with your mother" at a time t5'.

In this way, in the case of a conversation between children, no inquiry is made to the external service providing unit 21. Children have a low concept of privacy and may speak information regarding privacy. Furthermore, when making an inquiry to the external service providing unit 21, it is not favorable to cause a child to determine whether or not to make the inquiry even if the privacy information is included.

Therefore, as described above, an inquiry is not made to the external service providing unit 21 and a message prompting contact (consult) the parent is generated and given in notification to the child.

Since the system is based on the assumption of not making an inquiry to the external service providing unit 21, it is possible that the conversations between children is not monitored. Furthermore, setting can be made such that the conversation between children itself is monitored, and extraction of keywords, registration to the secret database 76, and the like are performed, but an inquiry to the external service providing unit 21 is not performed and supplementation of information or the like is not performed.

In a case where the keywords extracted from the conversation between children are registered to the secret database 76, the keywords are registered as the information to be kept secret.

Such not monitoring a conversation, or monitoring a conversation but treating the conversation as the secret information can be applied not only to the case of a conversation between child but also to a case of a conversation including a child, for example, a conversation between a parent and a child. Furthermore, in the case of a conversation between a parent and a child, utterance of the child may not be monitored or may be treated as the secret information, and utterance of the parent may be monitored and treated as the secret information depending on the content.

The case of the example illustrated in FIG. 15 has a possibility that the child A and the child B are friends, and one of the children A and B is a family member living in a house where the information processing system is installed, and the other of the children A and B is a person (guest) other than the family. Even in such a case where the guest is included, it is possible that the conversation is not monitored or is treated as the secret information.

Figure 16:
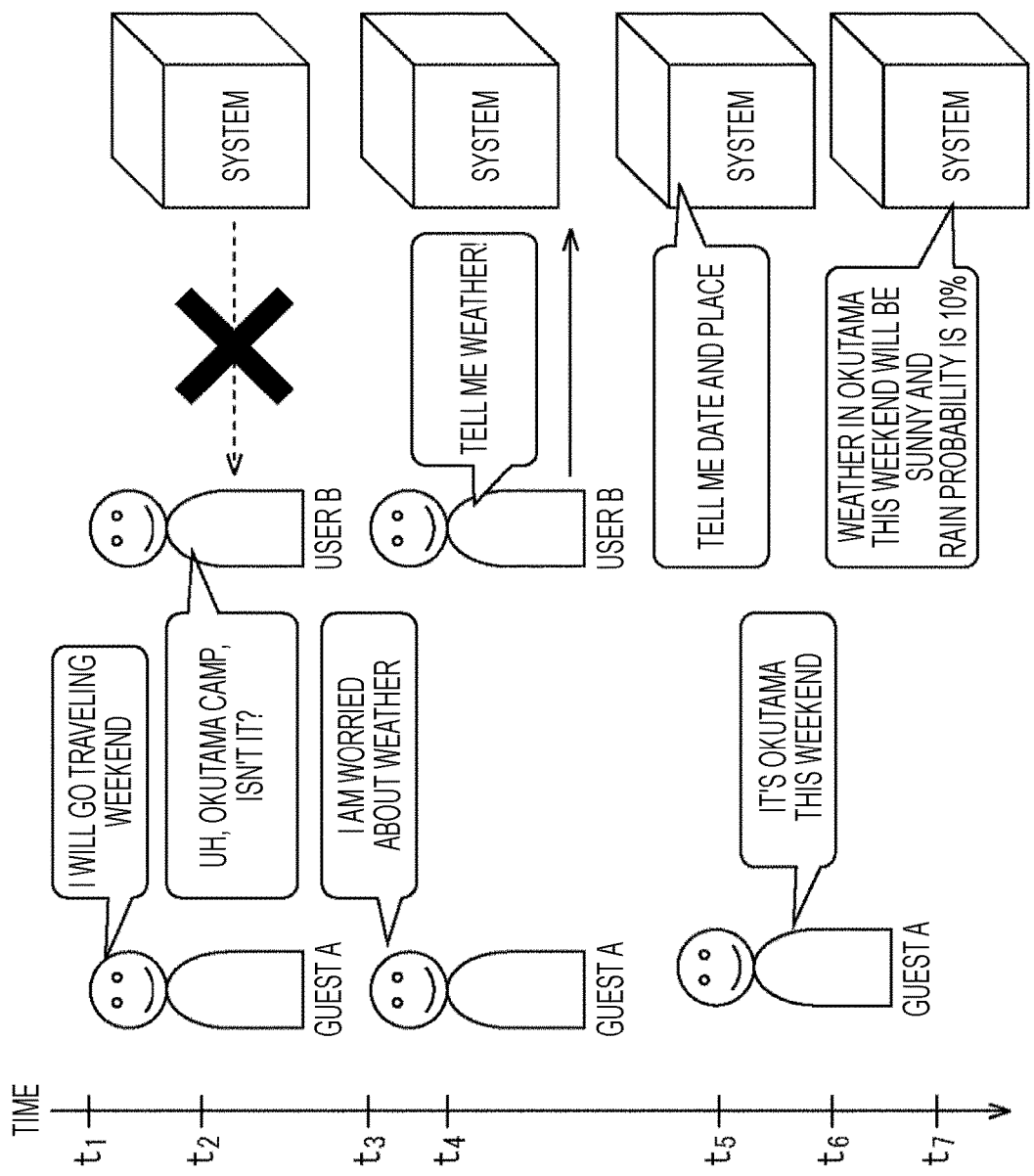
FIG. 16 is a diagram for describing an operation of the information processing system.

Monitoring of a conversation and supplementation of information in a case where a guest is included will be described with reference to FIG. 16. In FIG. 16, the user A is a family member of a house where the information processing system is installed, and a guest A is a person not a family member. Furthermore, a case where the user A and the guest A are both adults will be described as an example.

Setting of not monitoring a conversation, or monitoring a conversation but not supplementing information is set to a conversation with a guest in consideration of the privacy of the guest, for example.

At the time t1, the guest A says, to the user A, "I will go traveling weekend". In response to the speech, at the time t2, the user A says "Uh, the camp at Okutama". In response to the speech, at the time t3, the guest A says "I'm worried about the weather". The conversation so far is held between the guest A and the user A.

The conversation at this time is not monitored because the guest is included. Alternatively, the conversation is monitored and processing such as extracting keywords is performed, but supplementation of information and the like are not performed.

At the time t4, the user A asks the information processing system, "Tell me the weather". In the above-described example, for example, in the example described with reference to FIG. 11, the conversation is monitored and information is supplemented as necessary. Therefore, at the time t6, the information processing system replies "The weather in Okutama this weekend will be sunny and the rain probability is 10%".

In the example described with reference to FIG. 16, the guest is included, and thus the conversation is not monitored, or the conversation is monitored but supplementation of information is not performed. Therefore, at the time t5, the information processing system issues a message of "Tell me the place and date" to the user A.

Although information regarding the place and date such as the "Okutama" and the "this weekend" has been uttered in the conversation between the user A and the guest A from the time t1 to the time t3. However, since the conversation includes the guest, supplementation of information is not performed. As a result, the information regarding the place and date is insufficient. Therefore, the information processing system issues the message of "Tell me the place and date" to the user A and the guest A at the time t5 in order to obtain sufficient information.

As a result, the user A replies "It's Okutama this weekend" at the time t6. The information processing system can obtain the information regarding the place and date by obtaining the reply, the information processing system makes an inquiry to the external service providing unit 21 at a time t7, and issues a message of "The weather in Okutama weekend will be sunny and the rain probability is 10%" to the user A as an inquiry result.

In the case of a conversation including a guest in this way, it is also possible not to monitor the conversation itself. Alternatively, it is also possible that the conversation is monitored, and keywords are extracted and registered to the secret database 76, but supplementation with the registered information is not performed at the time of an inquiry to the external service providing unit 21.

Note that, in a case of making an inquiry to the external service providing unit 21 while a guest is present, processing for obtaining permission from the guest or the user (family member) may be included. That is, a mechanism for executing an inquiry to the external service providing unit 21 only when the guest or the user permits the inquiry in a case where the users in conversation includes the guest may be provided.

Here, the setting and the like of whether or not to monitor the conversation and whether or not to make an inquiry to the external service providing unit 21 in the case where the partner of the conversation is a person other than the family members will be described again. Here, for example, it is assumed that the setting such as monitoring or not monitoring a conversation is set according to a secret level.

The secret level is set according to the partner of the conversation. Note that, as will be described below, it is also possible to set the secret level according to the place where the conversation has been held or the like.

In a case of a family, the secret level is set to:

ON for monitoring a conversation (voice acquisition unit 51);

ON for registration to the user database 72 or the secret database 76; and

ON for supplementation of information at an inquiry to the outside (OFF for children as an exception). (This is setting 1)

In a case of a guest (a situation including a guest), the secret level is set to:

OFF for monitoring a conversation (voice acquisition unit 51);

OFF for registration to the user database 72 or the secret database 76; and

OFF for supplementation of information at an inquiry to the outside. (This is setting 2)

Alternatively, in the case of a guest (a situation including a guest), the secret level is set to:

ON for monitoring a conversation (voice acquisition unit 51);

ON for registration to the user database 72 or the secret database 76; and

OFF for supplementation of information at an inquiry to the outside. (This is setting 3)

The secret level may be set for each user in conversation or may be set according to the user in the case where a guest or a child is present in the users in conversation.

For example, in the case where the secret level is set for each user in conversation, and the conversation is held among the family members, the setting 1 is set for each user. Further, in the case where the secret level is set for each user, and the conversation is held between a family member and the guest, the setting 1 is set for the user corresponding to the family member and the setting 2 or the setting 3 is set for the user corresponding to the guest.

Furthermore, in a case where the secret level is not set for each user, and the secret level is set for each group, where the users in conversation are treated as one group, the setting 1 is set for a case where the group includes only family members, for example. Furthermore, for example, the setting 2 or the setting 3 is set for a case where the group includes a guest.

Which of the setting 2 and the setting 3 is set may be set by the user who manages the information processing system or may be set in advance.

Furthermore, the setting 1 may be set for a person who does not live with the family of the user who manages the information processing system but corresponds to a family member such as a relative, for example, or a person who frequently visits the family and is treated like a family member, even if the person is a guest.

For example, a person who visits the family five times or more is treated as a family member, and the secret level of the setting 1 is set. Note that a mechanism for making an inquiry as to if the secret level may be changed to an administrator who manages the information processing system when the secret level is changed may be provided. Then, the secret level may be changed only when an affirmative reply for the change is obtained from the administrator.

Furthermore, the secret level may be set by the administrator. For example, the setting 1 is set for family members but the setting 2 and the setting 3 can be set by the administrator even for the family members, or the setting 1 can be set even for a guest.

In this manner, the secret level is set by the user.

Furthermore, as the secret level, a secret level such as not recording a telephone conversation may be set. Since the conversation on the phone is a conversation with another person (guest), the secret level (the setting 2 or the setting 3) for the above-described guest may be set.

As an exception, the secret level (the setting 1) for family members may be set for a telephone conversation between family members.

<Secrecy by Place>

The secret level may be set according to a place. For example, in a case where the bedroom can be considered to be a place where the parents often have a conversation and the frequency of conversation regarding privacy is high, information obtained from the conversation in the bedroom is treated as the secret information.

Furthermore, for example, in a case where the living room can be considered to be a place where the family members often gather and have a conversation, and the frequency of conversation regarding privacy is low, information obtained from the conversation in the living room is basically not treated as the secret information. Basically not treating the conversation as the secret information means excluding some cases where the information is the secret information, such as the conversation including a child or a guest, and a topic treated as the secret information, in the above-described examples, for example.

Furthermore, in a case where the entrance is considered to be a place where the frequency of a conversation with a guest is high, information obtained from the conversation at the entrance is treated as the secret information. Furthermore, in the children's room, a possibility of having a conversation including children is high. Therefore, information obtained from the conversation in the children's room is treated as the secret information. Note that, here, the description will continue, taking the room such as the living room or the bedroom as an example. However, the present embodiment can be applied to a specific place (area) other than the concept of room. For example, an area of a room can be treated as an area treated as the secret information.

Such setting of the secret level for each room is set by default, and the setting can be changed by the user.

Figure 17:
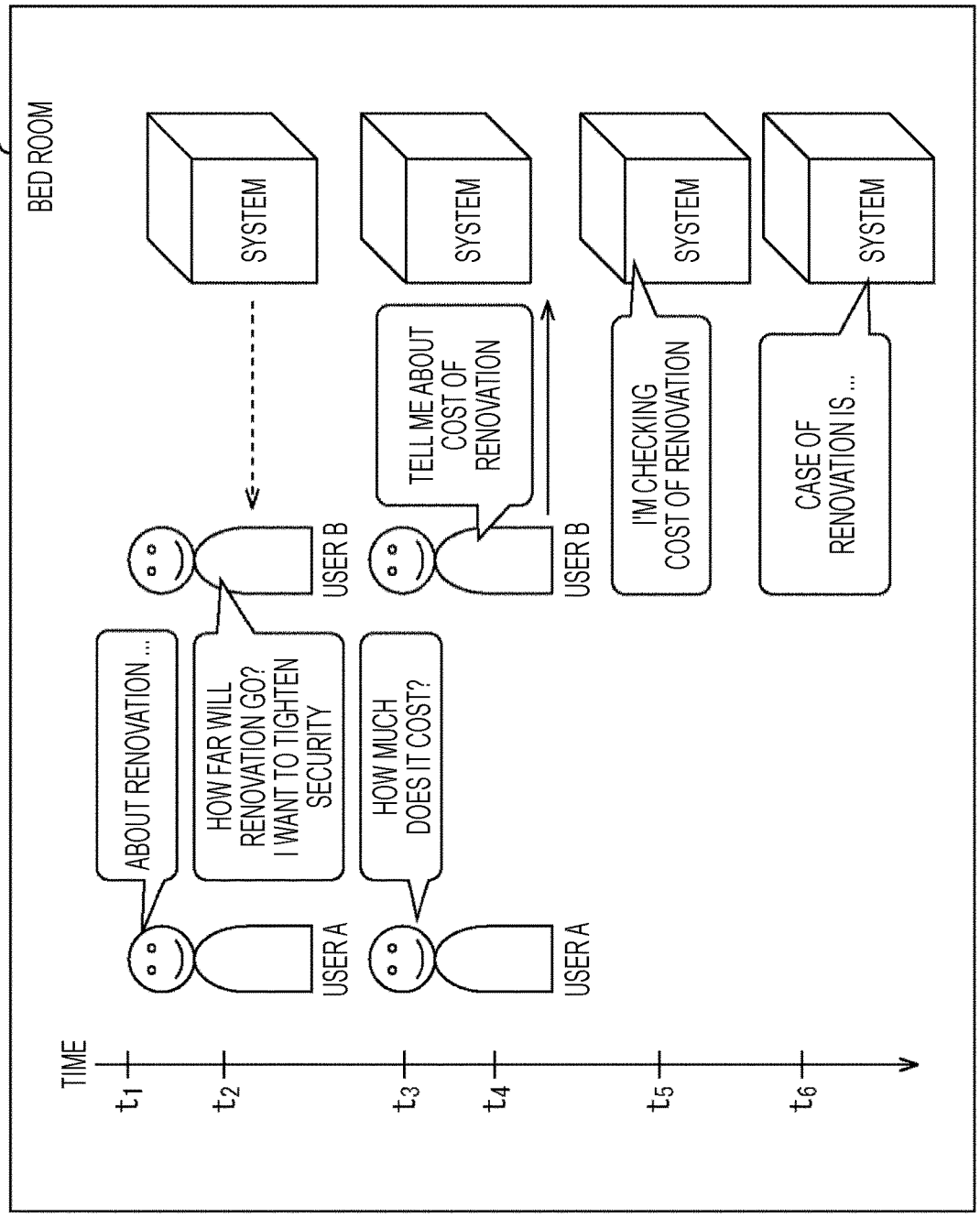
FIG. 17 is a diagram for describing an operation of the information processing system.

FIG. 17 illustrates a case in which the user A and the user B are having a conversation in a bedroom 201. At the time t1, the user A speaks to the user B "About renovation . . . ". At the time t2, the user B says "How far will the renovation go? I want to tighten the security".

At the time t3, the user A says "how much does it cost?". At the time t4, the user B issues a request "Tell me about the cost of renovation" to the information processing system. In response to the request, the information processing system issues a message "I'm checking the cost of the renovation".

The information processing system makes an inquiry about the cost of the renovation to the external service providing unit 21. At the time t6, the information processing system notifies the user of a search result "A case of renovation is . . . ".

Information from the conversation held in the bedroom 201 is set to the secret information. The information processing system monitors the conversation between the user A and the user B held from the time t1 to the time t3. As a result, the secret database 76 as illustrated in FIG. 18 is created, for example (the information is added to the secret database 76).

In the secret database 76 illustrated in FIG. 18, keywords such as "renovation" and "security" extracted from the conversation between the user A and the user B held from the time t1 to the time t3 are added.

The keyword of "renovation" is a keyword extracted from the conversation "About renovation . . . " uttered by the user A at the time t1. Furthermore, as the topic, the topic of "renovation" is associated, and "20160405 19:35" is associated as the update date and time.

Even if the topic of the "renovation" is not a topic corresponding to the secret information, the conversation is held in the bedroom. Therefore, the topic of the "renovation" is treated as the secret information. Therefore, as illustrated in FIG. 18, the keyword of the "renovation" is set as the secret information, and "1" is set as the secret flag.

Similarly, the keyword of the "security" is a keyword extracted from the conversation of "I want to tighten the security" uttered by the user B at the time t2. Furthermore, as the topic, a topic of "safety" is associated, and "20160405 19:35" is associated as the update date and time.

Even if the topic of the "safety" is not a topic corresponding to the secret information, the conversation is held in the bedroom. Therefore, the topic of the "renovation" is treated as the secret information. Therefore, as illustrated in FIG. 18, the keyword of the "security" is set as the secret information, and "1" is set as the secret flag.

Figure 19:
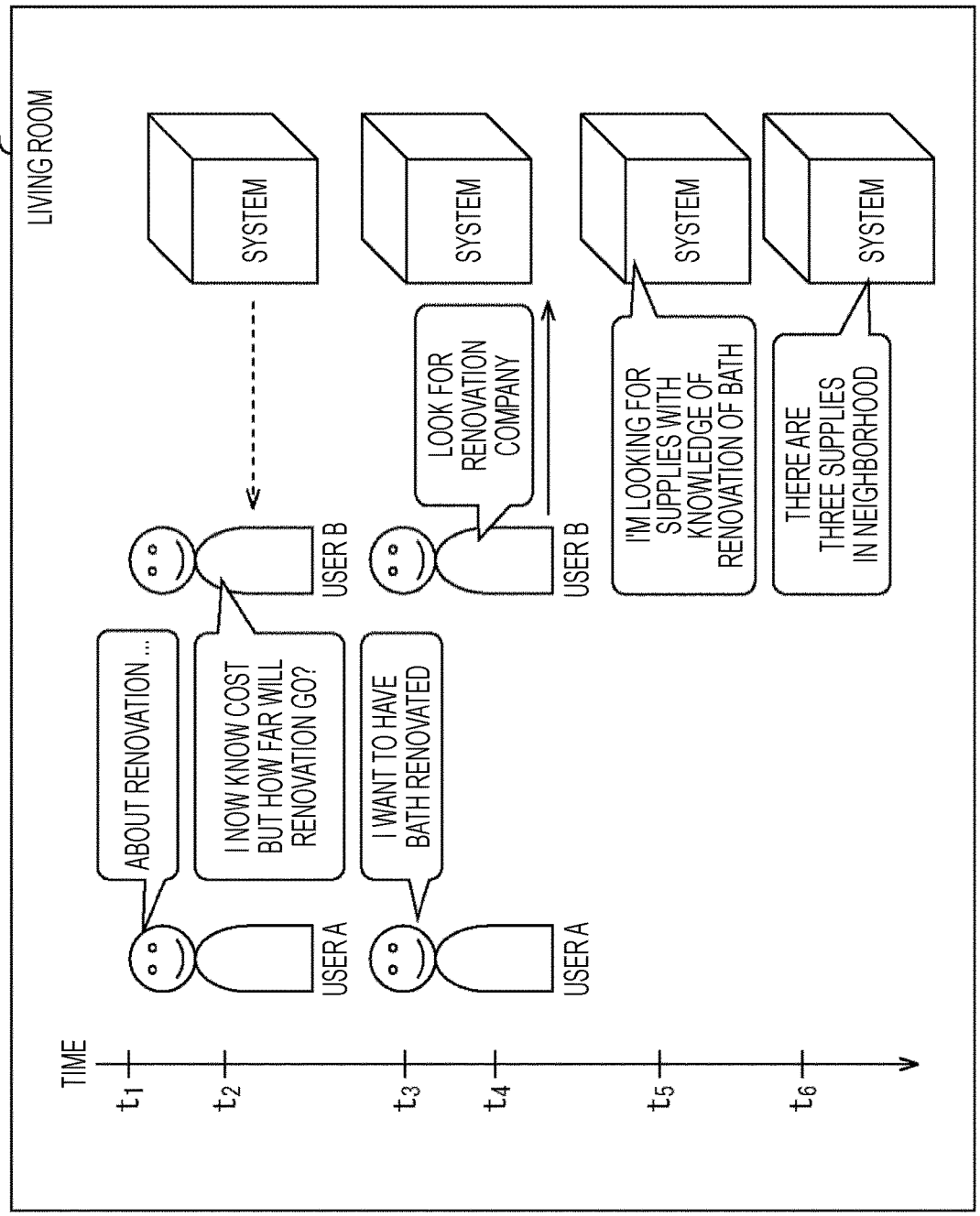
FIG. 19 is a diagram for describing an operation of the information processing system.

In a case where a conversation as described with reference to FIG. 19 is held in the living room 202 after such a secret database 76 is created, the information in the secret database 76 is updated. In the living room 202, the user A speaks to the user B "About renovation . . . " at the time t1.

At the time t2, the user B says "Now I know the cost but how far will the renovation go?". At the time t3, the user A says "I want to have the bath renovated". In response, the user B issues a request "Look for a renovation company" to the information processing system.

The information processing system monitors the conversation from the time t1 to the time t3 and extracts the keywords such as "renovation" and "bath". When extracting the keyword of the "renovation" from the conversation held in the living room 202, the information processing system refers to the secret database 76 illustrated in FIG. 18, and confirms that the keyword of the "renovation" has already been written and the secret flag is "1" (the secret information).

The keyword of the "renovation" is associated with the topic of the "renovation", and the topic of the "renovation" is a topic that is originally not the secret information, but because the keyword is extracted from the conversation in the bedroom 201, the keyword is set as the secret information. In such a state, the keyword of the "renovation" has been extracted from the conversation in the living room 202.

The conversation in the living room 202 is not set as the secret information if not corresponds to the secret information. Therefore, the keyword of the "renovation" extracted from the conversation in the living room 202 is not set as the secret information. In this case, the keyword of the "renovation" in which the secret flag is set to "1" is updated to the secret flag of "0", that is, not the secret information. As a result of the update, as illustrated in FIG. 20, the secret flag of the keyword of the "renovation" is updated to "0".

Note that, here, the case where the keyword corresponding to the topic of the "renovation" is only the "renovation" has been described as an example. Therefore, only the secret flag associated with the keyword of the "renovation" is updated from "1" to "0".

For example, in a case where there is a plurality of keywords corresponding to the topic of the "renovation", the secret flag of the plurality of keywords may be changed at once. That is, although the content talked in a predetermined room is set as the secret information, but if the content is talked in another room, the information may be changed to information that is not the secret information at once. In other words, the secret flags may be managed for each topic and may be changed on a topic-by-topic basis.

In the secret database 76, the keyword of the "bath" is additionally registered. Since the keyword of the "bath" is a keyword extracted from the conversation in the living room 202, the keyword is determined not to correspond to the secret information. Furthermore, since the topic is the "renovation", the topic is determined not to correspond to the secret information. Therefore, the secret flag is set to "0".

In this way, in a case where the keyword set to the secret information due to the place where the conversation has been held is extracted from a conversation in a place not set to the secret information, the secret level is changed and the information is reset to information that is not the secret information.

By performing the update in this way, the keyword of the "renovation" becomes not the secret information. Therefore, at the time t5 (FIG. 19), the information processing system issues a reply of "I'm looking for suppliers with knowledge of bath renovation". Information of the "bath" is supplemented in this message. In other words, since the topic of the "renovation" does not correspond to the secret information and the conversation has been held in the living room 202, supplementation of information is performed.

The information processing system executes an inquiry about "looking for suppliers with knowledge of bath renovation" to the external service providing unit 21. At the time t6, the information processing system notifies the user of a search result "There are three suppliers in the neighborhood".

In this way, the information in the secret database 76 is updated.

<Secrecy by Voice>

The secret level may be set according to the magnitude (volume) of a voice. For example, in a case where the voice is small, a possibility of having a conversation with high secrecy is high, the keyword extracted from the conversation with small voice is treated as the secret information.

Figure 21:
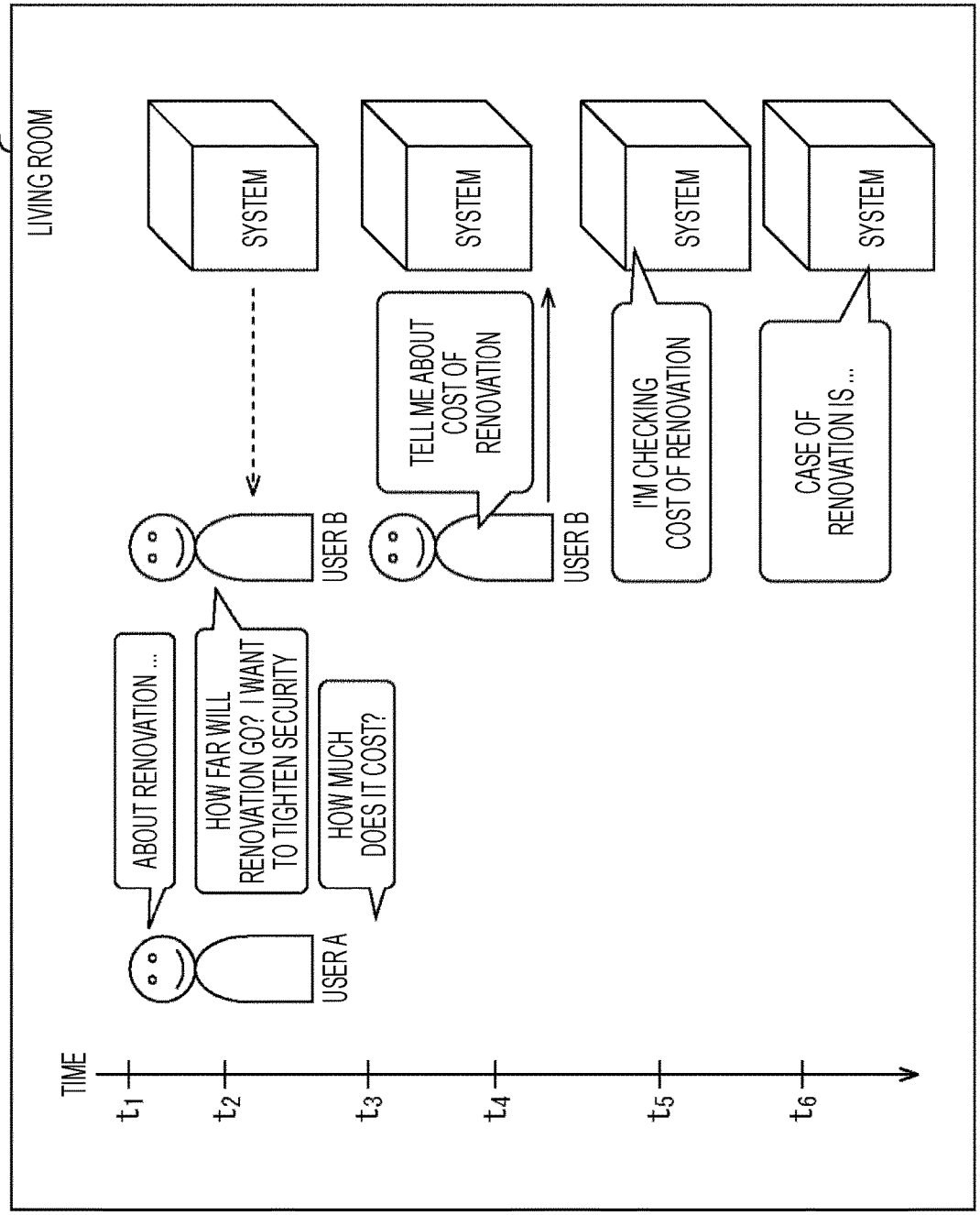
FIG. 21 is a diagram for describing an operation of the information processing system.

FIG. 21 illustrates a case in which the user A and the user B are having a conversation in the living room 202. At the time t1, the user A speaks to the user B "About renovation . . . ". At the time t2, the user B says "How far will the renovation go? I want to tighten the security". At the time t3, the user A says "how much does it cost?".

Since the conversation between the user A and the user B from the time t1 to the time t3 has been held with small voice (the volume is smaller than a predetermined value), processing of monitoring the conversation, extracting the keywords, and the like is performed. However, in the secret database 76, the conversation is registered as the secret information (registered with the secret flag of 1).

At the time t4, the user B issues a request "Tell me about the cost of renovation" to the information processing system. In response to the request, the information processing system issues a message "I'm checking the cost of the renovation". At this time, the information processing system does not supplement information because the conversation is held with small voice.

The information processing system makes an inquiry about the cost of the renovation to the external service providing unit 21. At the time t6, the information processing system notifies the user of a search result "A case of renovation is . . . ".

In this manner, information from the conversation held with small voice is set as the secret information. The information processing system monitors the conversation between the user A and the user B held from the time t1 to the time t3. As a result, the secret database 76 as illustrated in FIG. 18 is created, for example (the information is added to the secret database 76). The secret database 76 illustrated in FIG. 18 has been described, and the description thereof is omitted here.

In a case where a conversation as described with reference to FIG. 19 is held in the living room 202 after such a secret database 76 is created, the information in the secret database 76 is updated. Since the description with reference to FIG. 19 has been described, detailed description thereof is omitted.

The information processing system monitors the conversation from the time t1 to the time t3 in the living room 202 and extracts the keywords "renovation" and "bath". It is assumed that this conversation is not a conversation held with small voice.

When extracting the keyword of the "renovation" from the conversation held in the living room 202, the information processing system refers to the secret database 76 illustrated in FIG. 18, and confirms that the keyword of the "renovation" has already been written and the secret flag is "1" (the secret information).

The keyword of the "renovation" extracted from the conversation in the living room 202 is not set as the secret information. In this case, the keyword of the "renovation" in which the secret flag is set to "1" is updated to the secret flag of "0", that is, not the secret information. As a result of the update, as illustrated in FIG. 20, the secret flag of the keyword of the "renovation" is "0".

In a case where there is a plurality of pieces of information (keywords) set to the secret information due to the conversation with small voice, the secret flags for the plurality of keywords may be changed at once. That is, although the content talked with a predetermined volume or less is set as the secret information, but if the content is talked with the predetermined volume or more, the information may be changed to information that is not the secret information at once.

In this way, in a case where the keyword set to the secret information due to the volume of the voice with which the conversation has been held is extracted from a conversation with the volume of voice not set to the secret information, the secret level is changed and the information is reset to information that is not the secret information.

By performing the update in this way, the keyword of the "renovation" becomes not the secret information. Therefore, at the time t5 (FIG. 19), the information processing system issues a reply of "I'm looking for suppliers with knowledge of bath renovation". Information of the "bath" is supplemented in this message.

In this way, the information in the secret database 76 is updated.

Note that, as described with reference to FIG. 21, when an explicit instruction is output by a request from the user even when the conversation is held with small voice, supplementation of information is performed and the secret information is used as necessary, and an inquiry to the external service providing unit 21 may be made.

<Processing Flow>

Figure 22:
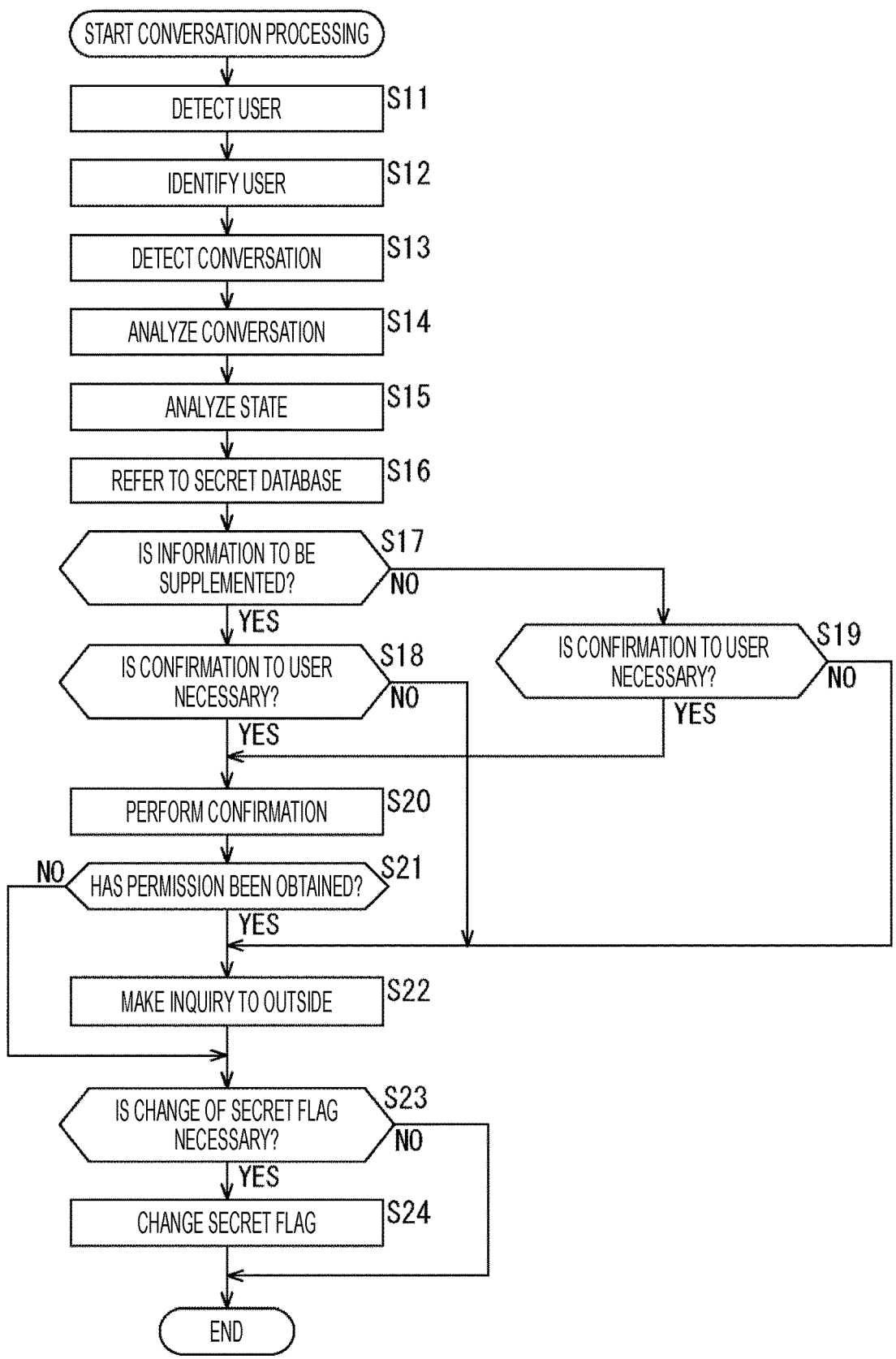
FIG. 22 is a flowchart for describing an operation of the information processing system.

The above processing will be described again with reference to the flowchart in FIG. 22. The processing of the flowchart illustrated in FIG. 22 is mainly performed by the information processing unit 12 (FIG. 6).

In step S11, the user recognition unit 73 detects the user in the room. In step S12, the user recognition unit 73 identifies the detected user by reference to the user database 72. For example, identification of a mother, a father, a child, and a guest is performed.

In step S13, the voice processing unit 74 starts monitoring the conversation and detects the conversation. In a case where the conversation is detected, in step S14, the conversation is analyzed (semantic analysis). With the analysis of the conversation, the keywords are extracted, and the topics when the keywords are added to the secret database 76 are set.

While the conversation is analyzed, the user state analysis unit 71 analyzes the situation in step S15. For example, the place (the bedroom, the living room, the entrance, or the like) where the conversation is taking place, the size (volume) of the voice being conversed, the user's gaze (whether or not the gaze is directed to the information processing system, for example) are analyzed.

Note that, in this analysis, only necessary analysis is performed. For example, as described with reference to FIGS. 17 and 19, in a case where one condition of determination as to whether or not to make the content be the secret information depends on the room where the conversation is taking place, the room where the conversation is taking place is analyzed.

Further, for example, as described with reference to FIG. 21, in a case where one condition of determination as to whether or not to make the content be the secret information depends on the volume, the volume with which the conversation is taking place is analyzed. Further, for example, as described with reference to FIG. 12, in a case where one condition of determination as to whether or not to make the content be the secret information depends on the user's gaze, the gaze of the user who is having the conversion is analyzed.

Of course, in a case where the determination as to whether or not to make the content be the secret information in consideration of the plurality of conditions, information (situations) for making the determination concerning the respective conditions are acquired and analyzed.

In step S16, the secret information determination unit 77 refers to the secret database 76. Referencing the secret database 76 is performed when some sort of request such as "Check blah-blah-blah" is issued from the user, for example.

In step S17, the inquiry generation unit 78 determines whether or not to supplement the information. In a case where supplementation of the information is determined in step S17, the processing proceeds to step S18. In step S18, the inquiry generation unit 78 supplements the information, and determines whether or not confirmation to the user is necessary in a case of making an inquiry to the external service providing unit 21.

For example, as described with reference to FIG. 4, in a case of supplementing information falling into the secret information, confirmation as to whether or not an inquiry including the secret information may be made is performed to the user. Therefore, in step S18, whether or not confirmation to the user is necessary is determined.

In step S18, in a case where the confirmation to the user is determined to be necessary, the processing proceeds to step S20. In step S20, the confirmation to the user is performed. For example, in the description with reference to FIG. 4, at the time t2, the confirmation to the user has been made by issuing the questionnaire "Do you want to search for the prognosis of the stage 3 of the cancer?"

As a result of the confirmation to the user, whether or not permission to the inquiry to the external service providing unit 21 has been obtained is determined in step S21. In a case where the permission from the user, for example, a voice for permitting the inquiry to the external service providing unit 21, such as "Do search", has been acquired, the inquiry having been permitted is determined in step S21, and the processing proceeds to step S22.

In step S22, the inquiry to the external service providing unit 21 is made. In this case, the supplementation of the information is determined in step S17, the necessity of the confirmation to the user is determined in step S18, and the obtainment of the permission to the inquiry is determined in step S21. Therefore, the inquiry to which the information is supplemented is made.

Meanwhile, in a case where it is determined in step S21 that the permission from the user has not been obtained, the processing of step S22 is skipped and the processing proceeds to step S23. That is, the processing is moved onto the next processing without making the inquiry to the external service providing unit 21.

Note that it is also good to make an inquiry excluding the secret information. Whether to cancel the inquiry itself or whether to make the inquiry excluding the secret information may be determined depending on the inquiry content. For example, in the inquiry excluding the secret information, the inquiry itself is canceled in a case where the information amount is too large.

Further, when it is determined that the secret information can be replaced with another information that is not secret, an inquiry in which the secret information is replaced with the another information that is not secret may be made.

Meanwhile, in a case where it is determined in step S18 that the confirmation to the user is not necessary, the processing proceeds to step S22 and the inquiry to the external service providing unit 21 is executed.

For example, as described with reference to FIG. 9, in a case where the supplemental information is not the secret information, the confirmation to the user is not required, so the inquiry is made to the external service providing unit 21 without getting the confirmation from the user.

Meanwhile, in a case where it is determined in step S17 that the information is not supplemented, the processing proceeds to step S19. In step S19, whether or not the confirmation to the user is necessary is determined. For example, in a case where the information is not supplemented but the inquiry content itself contains the secret information, the processing in step S19 is executed.

Furthermore, in a case where the users having the conversation include a child or a guest, the confirmation to the users is performed, as described with reference to FIGS. 15 and 16. Note that this confirmation includes not only the confirmation as to whether or not the inquiry can be made to the external service providing unit 21 but also confirmation to the user for obtaining sufficient information such as date and time or a place.

In step S19, in a case where the confirmation to the user is determined to be necessary, the processing proceeds to step S20. Since the processing in and after step S20 can be similarly performed to the above-described case, the description thereof will be omitted.

Meanwhile, in a case where it is determined in step S19 that the confirmation to the user is not necessary, the processing proceeds to step S22 and the inquiry to the external service providing unit 21 is executed. For example, as described with reference to FIG. 3, when making the inquiry not including the secret information, and when there is no insufficient information and there is no need to make the inquiry about provision of sufficient information to the user, the inquiry to the external service providing unit 21 is executed without getting the confirmation from the user.

In a case where the inquiry to the external service providing unit 21 has been made, an inquiry result is provided to the user.

In step S23, whether or not change of the secret flag is necessary is determined. For example, as described with reference to FIG. 19, in a case where the information set to the secret information due to the conversation having been held in a predetermined room or the conversation having been held with small voices is determined not to be the secret information, the secret flag is changed.

In a case where the change of the secret flag is determined to be necessary in step S23, the processing proceeds to step S24, and a corresponding secret flag in the secret database 76 is changed.

Meanwhile, in a case where the change of the secret flag is determined not to be necessary in step S23, the processing in step S24 is skipped, and the processing of the flowchart illustrated in FIG. 22 is terminated.

The information processing unit 12 performs such processing. Note that the flow of the processing here is an example, and pieces of processing may be performed in parallel or the order may be switched.

According to the present technology, the information regarding privacy can be prevented from being leaked to the outside when the user does not intend. Furthermore, external services can be used as needed even if the user does not perform any setting in advance, in other words, without bothering the user.

Furthermore, supplementation of information or the like when making an inquiry to the outside can be performed without bothering the user. Furthermore, since information to be supplemented can be acquired from a conversation (utterance) of the user, the information can be collected without causing the user to be conscious of the acquisition.

In the above-described embodiment, when information is added to or updated in the secret database 76, notification of the addition or update of the information may be provided to the user.

In the above-described embodiment, the examples in which the information processing system notifies the user of the inquiry content with voices or notifies the user of the inquiry result when executing an inquiry to the external service providing unit 21 have been described. However, the notification may be made using not only the voices but also texts, images, and the like. For example, information may be presented to a terminal at the user's hand.

In the above-described embodiment, when an inquiry is made to the external service providing unit 21, the inquiry content may be kept as a history in the user database 72 or the secret database 76. A history of conversation (such as keywords) and an inquiry history may be associated and stored.

Furthermore, such a history may be configured to be browsed and edited by the user. For example, the user may be able to delete accumulated information, specifying the information in conversation units or time units. Furthermore, the information stored in the secret database 76 may be deleted in chronological order after a certain period of time has elapsed. Furthermore, when a schedule is over, information related to the schedule may be deleted.

In the above-described embodiment, as timing to start monitoring a conversation, for example, when the volume of a voice greatly changes, when the gaze is directed to the information processing system (or a preset direction), when the monitoring is explicitly instructed by the user, or the like.

In the above-described embodiment, acquisition, presentation, and the like of information using a cloud service may be performed. For example, information already existing on the cloud side may also be used to determine whether or not a keyword is a keyword set as the above-described secret information and to set the secret level or the like.

For example, when the user is talking with a guest, processing of determining familiarity with the guest, using information of a social networking service (SNS), and setting keywords as the secret information when the user and the guest are familiar with each other, and setting the keywords as the secret information when the user and the guest are not familiar with each other, may be executed. In other words, a secret stage is divided from the information obtained from the SNS and the like, and processing based on the division may be performed.

Further, for example, processing of getting confirmation from the user or the like may be executed for information placed in the cloud or the like but shared by only specific members, when an inquiry is made to the external service providing unit 21.

Note that, a use status of a cloud service in which information is shared by others or the like may be used in addition to the SNS.

The above-described embodiment can also be applied to, for example, a conversation with a network connection destination. For example, the above-described embodiment can be applied to a conversation between an elderly who lives in a remote place and family members of the elderly. Content uttered by the elderly in a specific place of a house on the elderly side, for example, near a specific wall in a living room, may be transmitted from a specific place of a house on the family side to the family members, like a conversation across the wall.

Further, in such a case, sounds from other than the specific place may be processed and transmitted. For example, the family members can know the state of the elderly by a sound only, and the family members can know the safety of the elderly by transmitting such a sound to the family side.

However, actions (including conversations and the like) of the elderly in places than the specific place may be desired to keep secret, and sounds in places other than the specific place can be processed and transmitted or can be completely prevented from being transmitted in consideration of the privacy of the elderly.

Even in such a case, in a case where there is a possibility that information regarding privacy of the elderly is transmitted to the family side, the processing in the above-described embodiment is executed, whereby the information is prevented from being transmitted to the family side. Therefore, even in such an embodiment, the privacy can be protected.

<Recording Medium>

The series of processing described above can be executed by hardware or software. In the case of executing the series of processing by software, a program that configures the software is installed in a computer. Here, the computer includes a computer incorporated in dedicated hardware, and a general-purpose personal computer and the like capable of executing various functions by installing various programs, for example.

Figure 23:
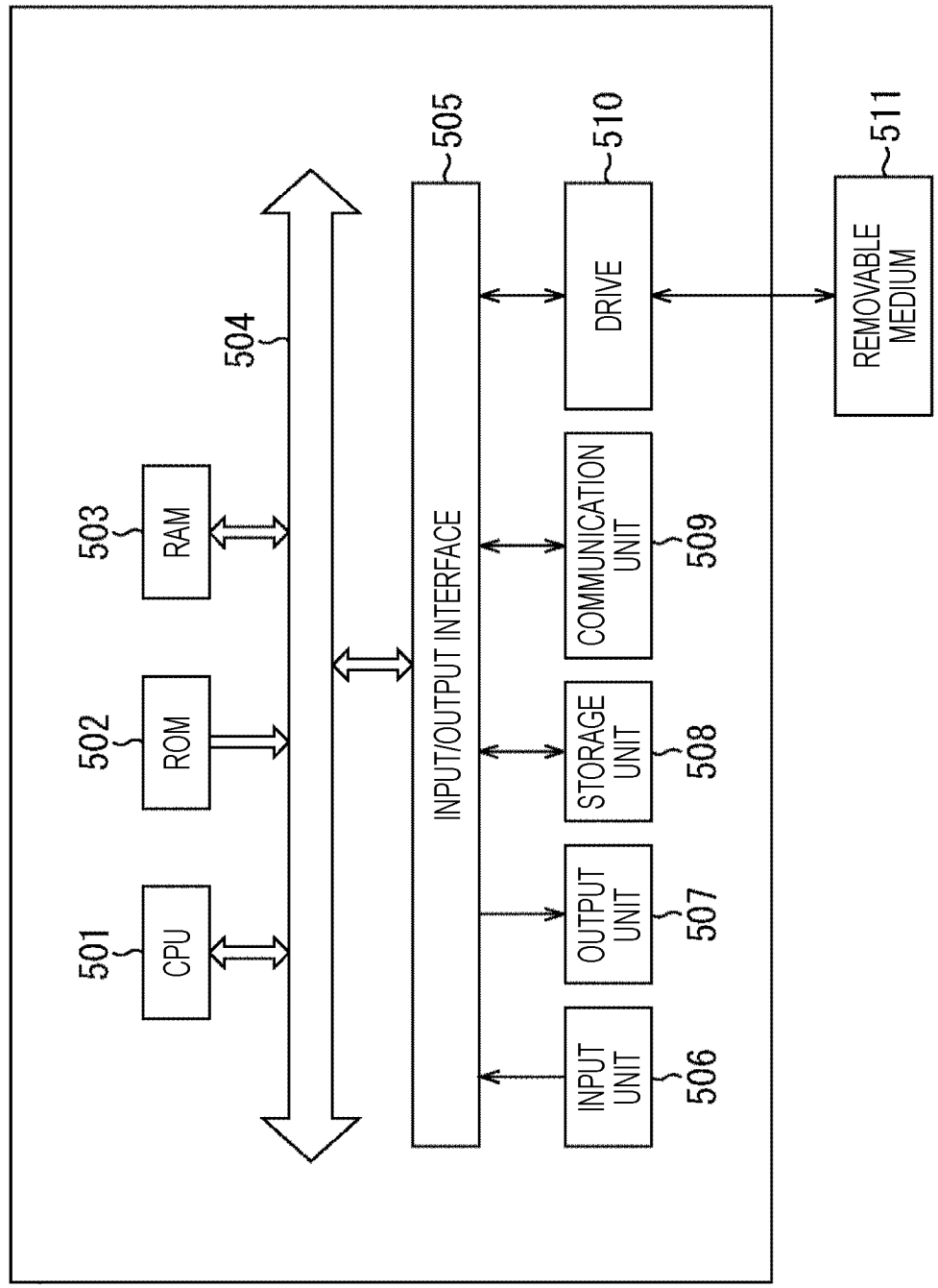
FIG. 23 is a diagram for describing a recording medium.

FIG. 23 is a block diagram illustrating a configuration example of hardware of a computer that executes the above-described series of processing by a program. For example, the information processing unit 12 (FIG. 6) can be configured by a computer.

In a computer, a central processing unit (CPU) 501, a read only memory (ROM) 502, and a random access memory (RAM) 503 are mutually connected by a bus 504. Moreover, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, or a semiconductor memory.

In the computer configured as described above, the CPU 501, for example, loads a program stored in the storage unit 508 into the RAM 503 and executes the program via the input/output interface 505 and the bus 504, whereby the above-described series of processing is performed.

The program to be executed by the computer (CPU 501) can be recorded on the removable medium 511 as a package medium or the like, for example, and provided. Furthermore, the program can be provided via a wired or wireless transmission medium such as a local area network, the Internet, or digital broadcast.

In the computer, the removable medium 511 is attached to the drive 510, whereby the program can be installed in the storage unit 508 via the input/output interface 505. Furthermore, the program can be received by the communication unit 509 via a wired or wireless transmission medium and installed in the storage unit 508. Other than the above method, the program can be installed in the ROM 502 or the storage unit 508 in advance.

Note that the program executed by the computer may be a program processed in chronological order according to the order described in the present specification or may be a program executed in parallel or at necessary timing such as when a call is made.

Furthermore, in the present specification, the system refers to an entire apparatus configured by a plurality of devices.

Note that the effects described in the present specification are merely examples and are not limited, and other effects may be exhibited.

Note that embodiments of the present technology are not limited to the above-described embodiments, and various modifications can be made without departing from the gist of the present technology.

Note that the present technology can also have the following configurations.

(1)

An information processing apparatus including:

an extraction unit configured to extract information from an utterance of a user;

an inquiry unit configured to make an inquiry to another apparatus when a request from the user is given; and a supplementation unit configured to supplement the information extracted by the extraction unit to inquiry content when the inquiry unit makes an inquiry.

(2)

The information processing apparatus according to (1), further including:

a determination unit configured to determine whether or not the information supplemented by the supplementation unit is information regarding privacy.

(3)

The information processing apparatus according to (2), in which the information extracted by the extraction unit is registered to a database in association with a flag indicating whether or not the information is the information regarding privacy.

(4)

The information processing apparatus according to (2), in which, in a case where the information supplemented by the supplementation unit is determined to be the information regarding privacy by the determination unit, the inquiry unit inquires of the user whether or not an inquiry including the information regarding privacy is made to the another apparatus.

(5)

The information processing apparatus according to (4), in which, in a case where an instruction not to make an inquiry to the another apparatus is given by the user, the inquiry to the another apparatus is canceled or an inquiry excluding the information regarding privacy is made.

(6)

The information processing apparatus according to (4), in which the determination unit performs the determination by reference to the database in which the information and the flag indicating whether or not the information is the information regarding privacy are associated with each other, and in a case where permission for making the inquiry is obtained from the user, the flag in the database indicating that the information is the information regarding privacy is updated with a flag indicating that the information is not the information regarding privacy.

(7)

The information processing apparatus according to any one of (1) to (6), in which, in a case where the user who has made the utterance is a user with low judgment capability, the supplementation unit does not supplement the information.

(8)

The information processing apparatus according to (3), in which, in a case where the user who has made the utterance is a user with low judgment capability, the flag to be associated with information from the utterance of the user with low judgment capability is set to a flag indicating that the information is the information regarding privacy.

(9)

The information processing apparatus according to any one of (1) to (8), in which, in a case where the user who has made the utterance is a guest, the supplementation unit does not supplement the information.

(10)

The information processing apparatus according to (3), in which, in a case where the user who has made the utterance is a guest, the flag to be associated with information from the utterance of the guest is set to a flag indicating that the information is the information regarding privacy.

(11)

The information processing apparatus according to (3), in which, in a case where the utterance is an utterance in a predetermined area, the flag to be associated with information from the utterance in the predetermined area is set to a flag indicating that the information is the information regarding privacy.

(12)

The information processing apparatus according to (11), in which, in a case where the information from the utterance in the predetermined area is obtained from an utterance in an area different from the predetermined area, the flag is updated with a flag indicating that the information is not the information regarding privacy.

(13)

The information processing apparatus according to any one of (1) to (12), in which the extraction unit does not extract the information from the utterance when there is no instruction from the user.

(14)

The information processing apparatus according to any one of (1) to (13), in which, in a case where a volume of the utterance of the user is a fixed value or less, the extraction unit does not extract the information from the utterance.

(15)

The information processing apparatus according to any one of (1) to (14), in which the supplementation unit supplements preference information of the user.

(16)

The information processing apparatus according to any one of (1) to (15), in which the supplementation unit supplements information obtained by reference to a schedule and a friend list of the user.

(17)

An information processing method including the steps of:

extracting information from an utterance of a user;

making an inquiry to another apparatus when a request from the user is given; and supplementing the extracted information to inquiry content when making the inquiry.

(18)

A program for causing a computer to execute processing including the steps of:

extracting information from an utterance of a user;

making an inquiry to another apparatus when a request from the user is given; and supplementing the extracted information to inquiry content when making the inquiry.

REFERENCE SIGNS LIST

11 Information acquisition unit
12 Information processing unit
21 External service providing unit
31 Out-of-home network
51 Voice acquisition unit
52 User state acquisition unit
71 User state analysis unit
72 User database
73 User recognition unit
74 Voice processing unit
75 Secret database creation unit
76 Secret database
77 Secret information determination unit
78 Inquiry generation unit

The invention claimed is:

1. An information processing apparatus comprising:
   an extraction unit configured to extract information from an utterance of a user;
   an inquiry unit configured to make an inquiry to another apparatus when another utterance of the user including a request from the user is given, the another utterance of the user being given after the utterance of the user; and
   a supplementation unit configured to supplement the inquiry using the extracted information to inquiry content when the inquiry unit makes an inquiry,
   wherein the extraction unit, the inquiry unit, and the supplementation unit are each implemented via at least one processor.

2. The information processing apparatus according to claim 1, further comprising:
   a determination unit configured to determine whether or not the information supplemented by the supplementation unit is information regarding privacy,
   wherein the determination unit is implemented via at least one processor.

3. The information processing apparatus according to claim 2, wherein
   the information extracted by the extraction unit is registered to a database in association with a flag indicating whether or not the information is the information regarding privacy.

4. The information processing apparatus according to claim 2, wherein,
   in a case where the information supplemented by the supplementation unit is determined to be the information regarding privacy by the determination unit, the inquiry unit inquires of the user whether or not an inquiry including the information regarding privacy is made to the another apparatus.

5. The information processing apparatus according to claim 4, wherein,
   in a case where an instruction not to make an inquiry to the another apparatus is given by the user, the inquiry to the another apparatus is canceled or an inquiry excluding the information regarding privacy is made.

6. The information processing apparatus according to claim 4, wherein
   the determination unit performs the determination by reference to a database in which the information and a flag indicating whether or not the information is the information regarding privacy are associated with each other, and
   in a case where permission for making the inquiry is obtained from the user, the flag in the database indicating that the information is the information regarding privacy is updated with a flag indicating that the information is not the information regarding privacy.

7. The information processing apparatus according to claim 1, wherein,
   in a case where the user who has made the utterance is a user with low judgment capability, the supplementation unit does not supplement the information.

8. The information processing apparatus according to claim 3, wherein,
   in a case where the user who has made the utterance is a user with low judgment capability, the flag to be associated with information from the utterance of the user with low judgment capability is set to a flag indicating that the information is the information regarding privacy.

9. The information processing apparatus according to claim 1, wherein,
   in a case where the user who has made the utterance is a guest, the supplementation unit does not supplement the information.

10. The information processing apparatus according to claim 3, wherein,
    in a case where the user who has made the utterance is a guest, the flag to be associated with information from the utterance of the guest is set to a flag indicating that the information is the information regarding privacy.

11. The information processing apparatus according to claim 3, wherein,
    in a case where the utterance is an utterance in a predetermined area, the flag to be associated with information from the utterance in the predetermined area is set to a flag indicating that the information is the information regarding privacy.

12. The information processing apparatus according to claim 11, wherein,
    in a case where the information from the utterance in the predetermined area is obtained from an utterance in an area different from the predetermined area, the flag is updated with a flag indicating that the information is not the information regarding privacy.

13. The information processing apparatus according to claim 1, wherein
    the extraction unit does not extract the information from the utterance when there is no instruction from the user.

14. The information processing apparatus according to claim 1, wherein,
    in a case where a volume of the utterance of the user is a fixed value or less, the extraction unit does not extract the information from the utterance.

15. The information processing apparatus according to claim 1, wherein
    the supplementation unit supplements preference information of the user.

16. The information processing apparatus according to claim 1, wherein
    the supplementation unit supplements information obtained by reference to a schedule and a friend list of the user.

17. An information processing method comprising the steps of:
    extracting information from an utterance of a user;
    making an inquiry to another apparatus when another utterance of the user including a request from the user is given, the another utterance of the user being given after the utterance of the user; and
    supplementing the inquiry using the extracted information to inquiry content when making the inquiry.

18. A non-transitory computer-readable medium having embodied thereon a program, which when executed by a computer causes the computer to execute an information processing method, the method comprising:
    extracting information from an utterance of a user;
    making an inquiry to another apparatus when another utterance of the user including a request from the user is given, the another utterance of the user being given after the utterance of the user; and
    supplementing the inquiry using the extracted information to inquiry content when making the inquiry.

* * * * *